(12) United States Patent
Lakhani et al.

(10) Patent No.: US 11,818,154 B2
(45) Date of Patent: Nov. 14, 2023

(54) PRIVILEGE INSIDER THREAT PROTECTION

(71) Applicant: iDee Limited, London (GB)

(72) Inventors: Al Lakhani, Munich (DE); Dennis Kelechi Okpara, London (GB)

(73) Assignee: iDee Limited, London (GB)

( * ) Notice: Subject to any disclaimer, the term of this patent is extended or adjusted under 35 U.S.C. 154(b) by 211 days.

(21) Appl. No.: 17/347,788

(22) Filed: Jun. 15, 2021

(65) Prior Publication Data

US 2021/0392151 A1 Dec. 16, 2021

Related U.S. Application Data

(60) Provisional application No. 63/039,030, filed on Jun. 15, 2020.

(51) Int. Cl.
*H04L 29/00* (2006.01)
*H04L 9/40* (2022.01)

(52) U.S. Cl.
CPC ........ *H04L 63/1425* (2013.01); *H04L 63/083* (2013.01); *H04L 63/1416* (2013.01); *H04L 63/1483* (2013.01); *H04L 63/20* (2013.01)

(58) Field of Classification Search
CPC ............... H04L 63/1425; H04L 63/083; H04L 63/1416; H04L 63/1483; H04L 63/20; H04L 63/0876; H04L 63/126; H04L 63/1466; H04L 63/102
See application file for complete search history.

(56) References Cited

U.S. PATENT DOCUMENTS

| | | | |
|---|---|---|---|
| 8,946,594 B2 | 2/2015 | Holmgren et al. | |
| 10,095,860 B1* | 10/2018 | McClintock | G06F 21/45 |
| 10,348,715 B2* | 7/2019 | Ross | H04L 63/0815 |
| 10,509,917 B2* | 12/2019 | Rotem | G06F 21/606 |

(Continued)

FOREIGN PATENT DOCUMENTS

| CN | 107515471 A | 12/2017 |
|---|---|---|
| TW | 201320159 A | 5/2013 |

(Continued)

OTHER PUBLICATIONS

Office Action dated Dec. 8, 2022, of counterpart Taiwanese Patent Application No. 108135696, along with an English translation.

(Continued)

*Primary Examiner* — Don G Zhao
(74) *Attorney, Agent, or Firm* — DLA Piper LLP (US)

(57) ABSTRACT

Systems and methods for preventing insider threats. An identity provider system at least one of identifies and authenticates one or more users. A relying party system provides access to at least one electronic resource. A storage system stores one or more immutable records. The immutable records store user credential reference information associated with the users, including verifiable assurance of user identity mutually written by the identity provider and relying party systems. The identity provider system and the relying party system are configured to independently at least one of verify and validate a user request associated with at least one user among the users based on the user credential reference information stored in the immutable records.

20 Claims, 11 Drawing Sheets

(56) References Cited

U.S. PATENT DOCUMENTS

| | | | | |
|---|---|---|---|---|
| 10,661,384 | B2* | 5/2020 | Kumkar | G02B 27/0927 |
| 2002/0174066 | A1* | 11/2002 | Kleckner | G06Q 20/10 |
| | | | | 705/39 |
| 2008/0155267 | A1 | 6/2008 | Lieber | |
| 2008/0189778 | A1* | 8/2008 | Rowley | H04L 9/3213 |
| | | | | 726/9 |
| 2008/0229111 | A1* | 9/2008 | Paya | H04L 9/3247 |
| | | | | 713/176 |
| 2009/0217368 | A1* | 8/2009 | Buss | G06F 21/34 |
| | | | | 726/9 |
| 2010/0325441 | A1* | 12/2010 | Laurie | H04L 9/3257 |
| | | | | 713/185 |
| 2011/0202991 | A1* | 8/2011 | Paquin | H04L 9/3213 |
| | | | | 726/5 |
| 2012/0011573 | A1* | 1/2012 | Menasce | G06F 21/40 |
| | | | | 726/4 |
| 2012/0173881 | A1* | 7/2012 | Trotter | H04L 9/0894 |
| | | | | 713/189 |
| 2013/0073460 | A1* | 3/2013 | Paquin | G06F 21/6263 |
| | | | | 705/44 |
| 2014/0088736 | A1* | 3/2014 | Cohen | G05B 9/03 |
| | | | | 700/79 |
| 2015/0310195 | A1* | 10/2015 | Bailor | G06F 21/45 |
| | | | | 726/6 |
| 2016/0080381 | A1* | 3/2016 | Hall | H04L 63/0884 |
| | | | | 726/7 |
| 2017/0111358 | A1* | 4/2017 | Hall | H04L 63/126 |
| 2018/0183766 | A1 | 6/2018 | Crabtree et al. | |
| 2019/0014110 | A1* | 1/2019 | Saravanan | G06Q 50/265 |
| 2019/0097802 | A1* | 3/2019 | Rowe | H04L 9/3213 |
| 2019/0333054 | A1* | 10/2019 | Cona | G06Q 20/383 |
| 2019/0340619 | A1 | 11/2019 | Leong et al. | |
| 2019/0394204 | A1* | 12/2019 | Bansal | G06F 21/41 |
| 2020/0177386 | A1* | 6/2020 | Mahmood | G16H 20/17 |
| 2020/0242595 | A1* | 7/2020 | Harrison | H04L 67/1097 |
| 2020/0285737 | A1* | 9/2020 | Kraus | G06F 21/552 |
| 2020/0403805 | A1* | 12/2020 | Steele | G06F 21/602 |
| 2021/0084024 | A1* | 3/2021 | Sadayoshi | G06F 9/451 |
| 2021/0256508 | A1* | 8/2021 | Moy | G06Q 50/265 |

FOREIGN PATENT DOCUMENTS

| | | |
|---|---|---|
| TW | 201626050 A | 7/2016 |
| WO | 2018/223125 A1 | 12/2018 |

OTHER PUBLICATIONS

Bao, Xuhua et al. "Towards the Trust-Enhancements of Single Sign-On Services", *2019 IEEE Conference on Dependable and Secute Computing (DSC)*, IEEE, Nov. 18, 2019, XP033676840.

International Search Report and Written Opinion from corresponding International Application No. PCT/EP2021/066087 dated Sep. 15, 2021.

"2020 Data Breach Investigation Reports", http://enterprise.verizon.com/resources/reports/dbir/.

"2019 DBIR Summary of Findings", http://enterprise.verizon.com/resources/reports/dbir/2019/summary-of-findings/.

"2020 Cost of Insider Threats: Global Report", http://observeit.com/cost-of-insider-threats/.

"Report to the Nations 2018 Global Study on Occupational Fraud and Abuse", http://acfe.com/report-to-the-nations/2018.

* cited by examiner

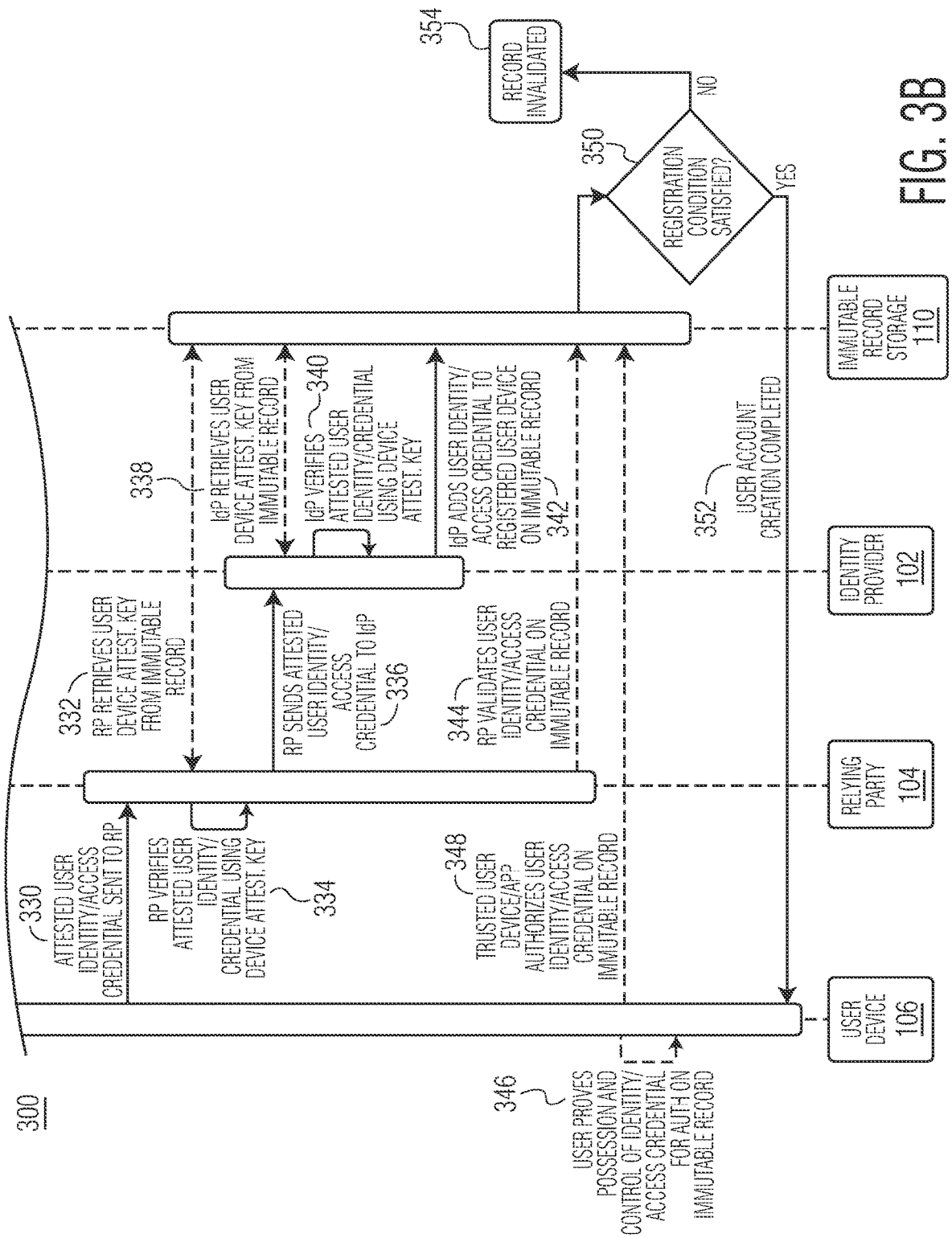

PRIVILEGE INSIDER THREAT PROTECTION

TECHNICAL FIELD

The present disclosure is generally directed to digital security systems, and more particularly, to systems and methods for preventing malicious threats from privilege insiders via immutable records, zero trust security, and secure identity proofing.

BACKGROUND

A privilege insider threat may be defined as a malicious threat to an organization that may come from people (e.g., users) within the organization with privilege rights, such as employees, former employees, contractors, business associates, etc. who may have inside information concerning the organization's security practices, data, computer systems and the like. The threat may involve, for example, fraud, theft of confidential and/or commercially valuable information, theft of intellectual property, bypass of access control mechanisms and/or the sabotage of computer systems. The privilege insider may abuse their authorized access or the access of their colleagues intentionally or unintentionally (e.g., for illegitimate reasons). Privilege insiders may also contribute directly or indirectly in making the organization vulnerable for outsiders to exploit.

Privilege insiders (also referred to herein as privilege users) often have rights to execute administrative tasks on an organization's systems, such as handling of source code, system designs, system applications, access control, databases, file systems, network upgrades and/or tasks to address any other suitable technical changes. A privilege user's ability to bypass an organization's security controls is what makes these users very dangerous. For example, a privilege user can inappropriately or fraudulently, either maliciously, accidentally or through willful ignorance of policies, circumvent existing security controls.

Privilege insider threats are one of the significant security risks facing potentially all organizations in various sectors. According to a recent report ("2020 Data Breach Investigation Reports," enterprise.verizon.com/resources/reports/dbir/, incorporated by reference herein), abuse of privileged accounts is the second most common cause of security incidents and the third most common cause of breaches. The report shows that in 2018, 73% of all breaches were perpetrated by outsiders while 28% involved internal actors, 12% of the breaches involved the misuse of privileges. In a 2019 report ("2019 DBIR Summary of Findings," enterprise.verizon.com/resources/reports/dbir/2019/summary-of-findings/, incorporated by reference herein), it was noted that breaches perpetrated by outsiders decreased to 69% and those that involved internal actors increased to 34%. In the same vein, the attacks that leveraged the misuse of privilege credentials increased to 15%. In 2020, internal actors accounted for 30% of all breaches.

The cost of insider threats is also increasing at an alarming rate. According to another report conducted by the Ponemon Institute ("2020 Cost of Insider Threats: Global Report," observeit.com/cost-of-insider-threats/, incorporated by reference herein), "the number of insider-caused cybersecurity incidents increased by a whopping 47% since 2018. The average annual cost of Insider Threats has also skyrocketed in only two years, rising 31% to $11.45 million". Malicious insiders alone cost organizations $4.08 million per year. The Association of Certified Fraud Examiners (ACFE) noted ("Report to the Nations 2018 Global Study on Occupational Fraud and Abuse," acfe.com/report-to-the-nations/2018/, incorporated by reference herein) that the average organization loses 5% of its revenues due to fraud by its own employees each year and that "Internal control weaknesses were responsible for nearly half of frauds."

Conventional privilege insider threat prevention mechanisms rely mostly on monitoring and analyzing the activities of privileged users. In some cases, conventional mechanisms may use manual mechanisms for dual access control to ensure that two or more people cannot collude to perpetrate an illegitimate action. Yet, most organizations have trouble identifying a credible threat associated with an insider's actions. Conventional Security Information and Event Management (SIEM) systems may be able to monitor, analyze and alert an organization of unauthorized data access, for example, if configured and monitored correctly. A conventional SIEM may determine baseline behaviors and note deviations. However, a conventional SIEM may be unable to prevent an actual abuse of privileges, especially when it is the privileged users that define and implement the SIEM. An insider knows the security vulnerabilities in an organization, and as such, can easily exploit them to bypass the security safeguards.

The simplest and most common situation of a privilege insider threat may occur when a privilege insider uses legitimate permissions for malicious activities within the organization or in a third party system. For example, many service provider (SP) systems may rely on an internal or external identity provider (IdP) system for identification, authentication and authorization of its users to its systems and applications. There may be no way for the SP (e.g., a relying party (RP) system) to detect whether a privilege malicious insider within the identity provider manipulated and/or totally bypassed the end-user authentication. For example, the privilege malicious insider can fabricate a response to the RP system. The RP system may simply trust that the response came from the identity provider. There is no end-to-end trust, however, between the RP and the end-user. There is no verifiable proof given to the RP by the IdP that the end-user, indeed, performed the authentication and/or authorization to grant access to the intended service. As a result, a malicious privilege insider may have unauthorized, illegitimate access to the end-user's account.

Another example is a situation where an IdP system has been compromised and under the control of an attacker. The attacker with elevated privileges on the IdP system can initiate, manipulate and/or re-direct an access request/response to a relying party. There may be no way for the relying party to detect that the end-user did not participate in this transaction.

In the above examples, a privilege insider can send an access response to the relying party without actual authentication by the user. Multi-factor authentication (MFA) may increase the security of a user account but, it cannot prevent a malicious privilege insider threat.

It may be possible to reduce insider threats by ensuring, for example, that there are no passwords that could be exploited due to privilege user's negligence, prohibiting credential sharing between employees and the use of digital dual data access control (multi-party approval) for sensitive systems. However, the conventional threat reduction techniques discussed above cannot prevent a privilege insider from unauthorized use of their elevated privileges and circumvention of security controls and policies.

Accordingly, there is a need for a solution to detect and prevent a privileged insider from abusing their access rights for malicious activities. There is also a need to prevent an outsider (an attacker) with elevated privileges from having unauthorized access to restricted locations and/or resources, and, for example, making illegitimate transactions and/or circumventing security controls in a compromised enterprise system.

SUMMARY

Aspects of the present disclosure relate to systems and methods for preventing privilege insider threats. A threat prevention system includes an identity provider system, a relying party system and a storage system. The identity provider system is configured to at least one of identify and authenticate one or more users. The relying party system is configured to provide access to at least one electronic resource. The storage system is configured to store one or more immutable records. The storage system is in communication with the identity provider system and the relying party system via at least one network. The one or more immutable records are configured to store user credential reference information associated with the one or more users. The user credential reference information includes verifiable assurance of user identity mutually written by the identity provider system and the relying party system. The identity provider system and the relying party system are configured to independently at least one of verify and/or validate a user request associated with at least one user among the one or more users based on the user credential reference information stored in the one or more immutable records.

BRIEF DESCRIPTION OF DRAWINGS

FIGS. 3A and 3B is a signal flow diagram of an exemplary method of user identity proofing for the system shown in FIG. 1, according to an aspect of the present disclosure.

DETAILED DESCRIPTION

Figure 1:
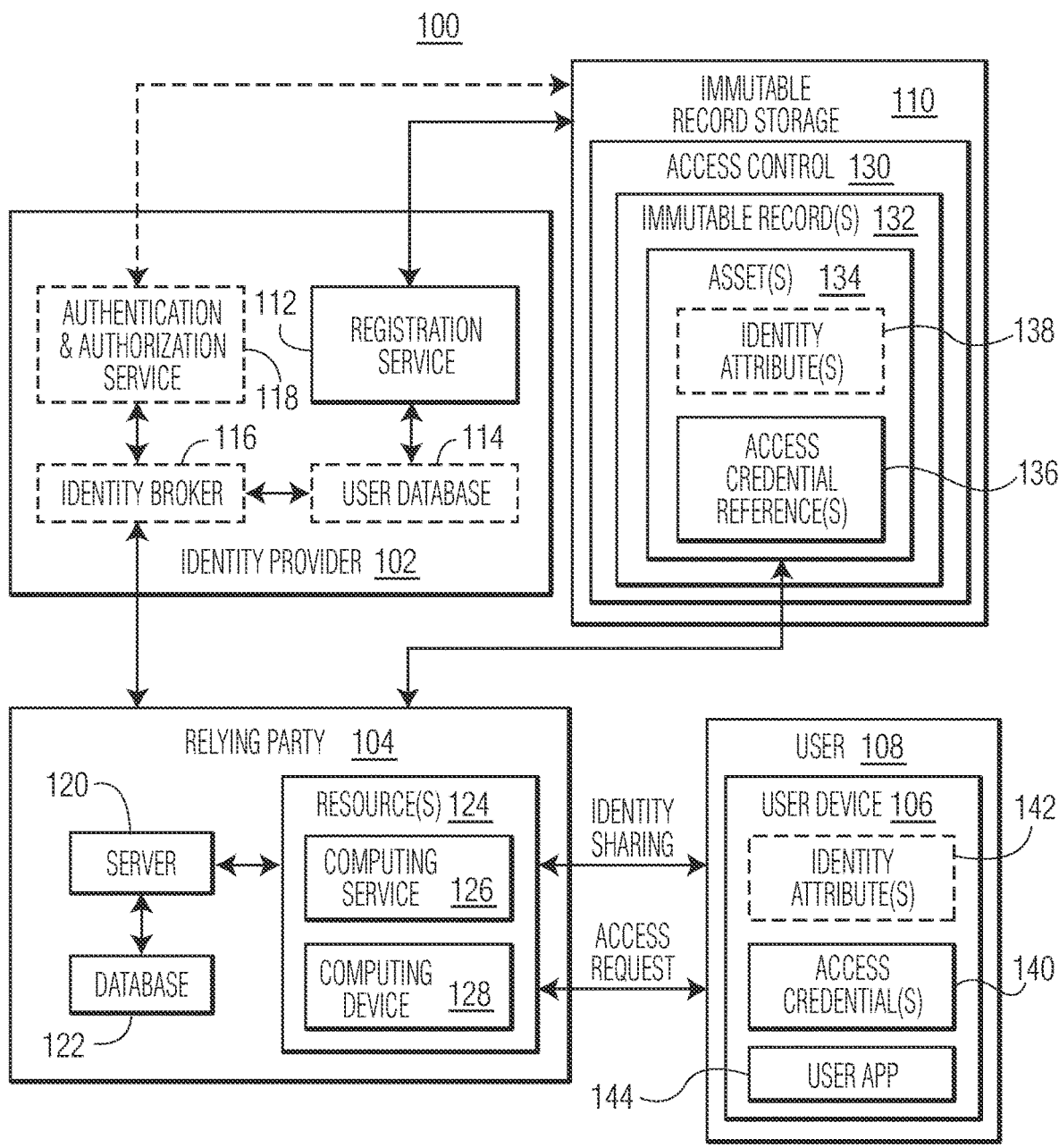
FIG. 1 is a functional block diagram of an exemplary embodiment of a threat prevention system, according to an aspect of the present disclosure.

Aspects of the present disclosure relate to systems and methods for privilege insider threat prevention. A threat prevention system may include an identity provider system configured to identify and/or authenticate one or more users, a relying party system and immutable record storage storing one or more immutable records. In some examples, the relying party system may provide access to computing service(s) and/or computing device(s). The immutable record(s) may store user credential reference information associated with the user(s). In some examples, the user credential reference information may include verifiable assurance of user identity mutually written by the identity provider system and the relying party system. In an exemplary embodiment, the identity provider system and the relying party system may independently verify and/or validate transaction(s) and/or access request(s) associated with the user(s), based on the user credential reference information stored in the immutable record(s). Each of the identity provider system and the relying party system may be prevented from altering and/or destroying the user credential reference information stored on the immutable record(s).

According to aspects of the present disclosure, the threat prevention system may provide a verifiable proof of trust in a delegated identity and access management (IAM) system to assure the relying party system that its end-user(s) indeed participated and authorized a transaction/access request. In some examples, the threat prevention system of the present disclosure may remove trust from a federated identity provider and transfer the trust to the end user (described further below).

According to aspects of the present disclosure, privilege insider threat prevention systems may use immutable records (e.g. records whose state cannot be altered after its creation, such as records stored in blockchain, distributed ledgers, write once read many (WORM) storage etc.), cryptographic primitives, zero-trust security and secure identity proofing to establish a verifiable assurance of the origin and provenance of an access request/response. In the present disclosure, the verifiable assurance may be used by the relying party to verify the origin, provenance, integrity and non-repudiation of a transaction. According to aspects of the present disclosure, a privilege insider threat prevention system may be configured using unparalleled attributes of an immutable record storage (e.g. blockchain, distributed ledger, etc.) with utmost privacy, with state-of-the-art provable security and, in some examples, with a minimal or zero trust and/or zero knowledge architecture for enterprise identity and access management.

Unlike conventional privilege insider threat prevention techniques, systems and methods of the present disclosure do not rely on the monitoring of the privilege user's activities, dual access control and/or on multi-factor authentication to prevent the abuse of privileges by insiders and/or outsiders with escalated privileges. Instead, the present disclosure leverages secure identity proofing to cryptographically bind the privilege user identity to a physical user device (e.g., a smartphone, a computer device, a wearable device, a software and hardware cryptographic device, etc.). Both the privilege user's organization (identity provider and/or relying party) of the present disclosure and the end-user may be configured to participate to establish a verifiable assurance (i.e., proof) of the user identity at the point of user enrollment. In the present disclosure, the established cryptographically verifiable assurance is mutually written to an immutable record in immutable record storage (e.g. blockchain, distributed ledger, etc.) that may be secure, fault tolerant, and efficient for enterprise asset and identity management needs. Threat prevention systems of the present disclosure may represent a zero trust security design, which ensures that the relying party does not need to blindly trust the identity provider system to securely provision the user identity. Rather, both the relying party and the identity provider participate in provisioning a mutually trusted immutable user identity and access credentials.

With conventional identity providers techniques, the user access credentials are typically solely provisioned and controlled by the identity provider. The relying party has to "trust" that the identity provider is not compromised by external actors and/or by privilege malicious insiders. When this type of trust is exploited by a privilege malicious insider or by an external actor with an insider's privilege, the access to the relying party's end-user accounts is possible without the knowledge of the end-user; this means that the system is not compromise resistant (e.g., as defined by standards organizations such as the National Institute of Standards and Technology (NIST)). This is because there are no means, in conventional techniques, for the relying party to independently verify that the origin and authenticity of the access request was indeed from the authorized end-user. The privilege insider threat may be as a result of a compromised identity provider system and/or relying party system. It may as well, be due to a malicious privilege insider within the identity provider and/or the relying party's organization.

Social identity (e.g., where social networks may authenticate the end-users and provide a token to the relying party to grant the user access) may also be vulnerable to privilege insider threats. The relying party may delegate Identity and Access Management (IAM) of its customers to a social network such as Facebook™, Google+™ and LinkedIn™. The relying party may grant access to its user's resources because the social network indicated that the user identity has been verified. However, the relying party has no proof that the user has initiated the access because the relying party has to trust the social network. Social attacks are responsible for 22% of breaches (see "2020 Data Breach Investigation Reports"). The same threat may be applicable to Security Assertion Markup Language (SAML), OAuth, OpenID Connect and other authentication protocols. These protocols rely on the relay of an assertion (access token) from the identity provider to grant access to restricted resources. Although, assertions are provided to the relying party from the identity provider, the relying party doesn't have any visibility on who actually initiated/authorized the transaction.

With the privilege insider threat prevention systems (also referred to herein as threat prevention systems) of the present disclosure, the mutually trusted immutable user identity and access credentials established by both the relying party and the identity provider at enrollment may be leveraged to provide a cryptographically verifiable assurance to the relying party on every user initiated transaction. In some examples, this assurance can only originate from the user-controlled device. The identity provider and/or the relying party may not have any control over the assurance. Instead the control may exists locally on the user device. Assuming the identity provider's system is under the control of an attacker with privilege rights, any transaction initiated by the attacker, according to the present disclosure, may be automatically rejected by the relying party, as the request would not have the cryptographically verifiable assurance of that impersonated user account. This may also be applicable to cases where the identity provider privilege insider is malicious. Thus, according to aspects of the present disclosure, even if the privilege malicious insider is able to initiate or alter access requests, the relying party may detect it. This is because the relying party (in the present disclosure) has direct access to an immutable reference of the user credential that not even the identity provider can change.

The privilege insider threat prevention systems and methods of the present disclosure include several benefits over conventional treat prevention systems. For example, the threat prevention system of the present disclosure provides a mutual assurance between the user (or device) and the relying party, and between the identity provider and the user. In the threat prevention system, the relying party and identity provider may participate in establishing the user identity and access credentials. Moreover, in the threat prevention system, an established user credential may be immutable and cannot be changed by the identity provider or the relying party. In addition, with the threat prevention system of the present disclosure, the trustworthiness of the user identity may be publicly verifiable. In addition, with the threat prevention system of the present disclosure, the identity provider may be unable to initiate a successful transaction without the user. A transaction initiated by an external attacker and/or by a malicious insider may thus be detected and rejected by the threat prevention system. The threat prevention system also provides assurance of transaction integrity and provenance, and verifiable assurance of transactions (including, in some examples, assurance of all transactions). Moreover, with the threat prevention system of the present disclosure, the identity provider may not be a single point of failure. Also, the threat detection system may allow a user to be in total control of her identity and access credentials. Yet further, the threat prevention system provides zero trust security. In other words, the threat detection system removes trust from the identity provider and the enterprise (relying party) network and transfers the trust o the user and its trusted device.

Privilege insider threat prevention systems and mechanisms of the present disclosure may provide a novel approach to solving privilege insider threats to enterprise Identity and Access management (IAM). The threat prevention system may include immutable record storage (e.g. blockchain, distributed ledger, etc.), at least one user device (e.g. a smartphone, a computer device, a wearable device, a software or hardware cryptographic device or any other suitable device) and cryptography for efficient enterprise IAM. Non-limiting examples of IAM may include user and/or machine identification, authentication, authorization, identity sharing, multi-party authorization, workflow approval, asset transfer between entities and any other suitable functionality.

In threat prevention systems of the present disclosure, IdP systems, RP systems (e.g., SPs) and end-users can directly and/or indirectly manage its identity attributes and/or credentials. The privacy and privileges of the parties may be preserved through security controls such as least privilege, separation of privileges, need-to-know, cryptography and access control mechanisms (e.g., role-based access control, dual control, etc.). The access control and privileges can be achieved with or without a smart contract. For example, a blockchain platform that has inbuilt access control functions such as Hyperledger® Iroha (a distributed ledger with prebuilt permission system) may not include a smart contract to achieve desired access control mechanisms. In some cases, a smart contract may be used depending on the platform to execute a transaction. In other cases, a database and/or a WORM storage may be suitable to achieve the desired security functionality.

FIG. 1 is a functional block diagram of example threat prevention system 100 (also referred to herein as system 100 or privilege insider threat prevention system 100), according to aspects of the present disclosure. System 100 may include at least one identity provider 102, at least one relying party 104, at least one user device 106 associated with user 108 and immutable record storage 110 storing one or more immutable records 132. Although FIG. 1 illustrates one identity provider 102, one relying party 104 and one user device 106, it is understood that FIG. 1 illustrates an example configuration, and that system 100 may include one or more identity providers 102, one or more relying parties 104 and one or more user devices 106.

Although not shown, one or more components among identity provider 102, relying party 104, user device 106 and immutable record storage 110 may be communicatively coupled via one or more communication (e.g., wired and/or wireless) networks. The one or more networks may include, for example, a private network (e.g., a local area network (LAN), a wide area network (WAN), intranet, etc.) and/or a public network (e.g., the Internet).

Identity provider 102 (also referred to herein as IdP 102) may be defined as an entity system that facilitates user enrollment, identification, authentication and/or authorization, and may provide information about user identity and authentication/authorization status to relying party 104 in an IAM system. In some examples, identity provider 102 may communicate with relying party 104 and/or immutable record storage 110. Although not shown in FIG. 1, identity provider 102 may communicate with user device 106. Identity provider 102 may include registration service 112, and in some examples, one or more of optional user database 114, optional identity broker 116 and optional authentication & authorization service (AAS) 118.

In some examples, one or more of components 112-118 of identity provider 102 may communicate with each other via a data and control bus (not shown). In some examples, components 112-118 of identity provider 102 may be embodied on a single computing device. In other examples, components 112-118 of identity provider 102 may be embodied on two or more computing devices distributed over several physical locations, connected by one or more wired and/or wireless links.

Although not shown, identity provider 102 may include at least one processor, one or more interfaces (e.g., an electronic device including hardware circuitry, an application on an electronic device) for communication with other components of system 100 (e.g., relying party 104, user device 106, immutable record storage 110, etc.) and non-transitory memory storing one or more routines and/or algorithms to implement components 112-118. It should be understood that identity provider 102 refers to a computing system having sufficient processing and memory capabilities (e.g., such as computer system 1000 shown in FIG. 10) to perform the specialized privilege insider threat prevention protocols and functionality of the present disclosure, as described herein.

Figure 2:
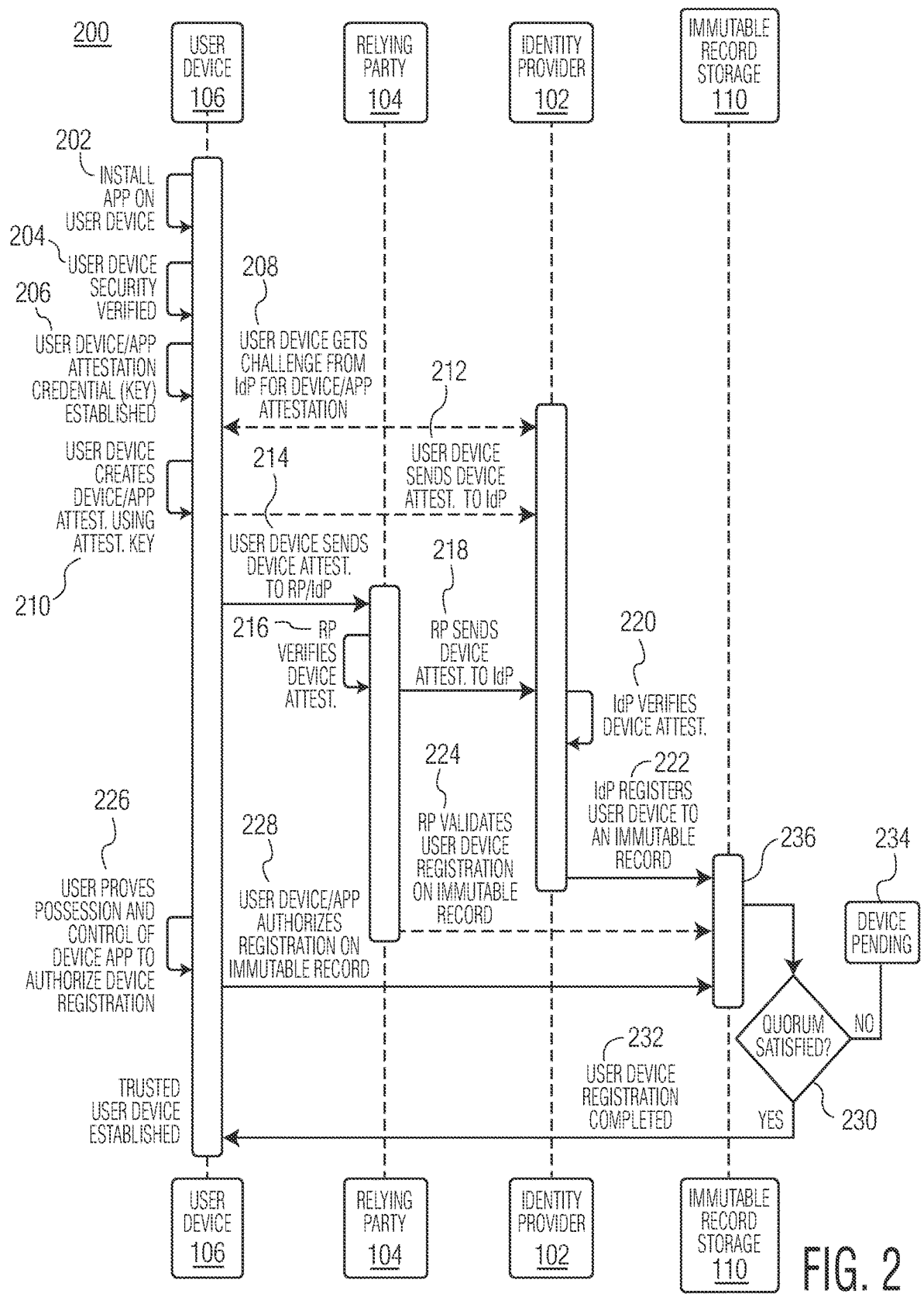
FIG. 2 is a signal flow diagram of an exemplary method of registering a user device for the system shown in FIG. 1, according to an aspect of the present disclosure.
Figure 3A:
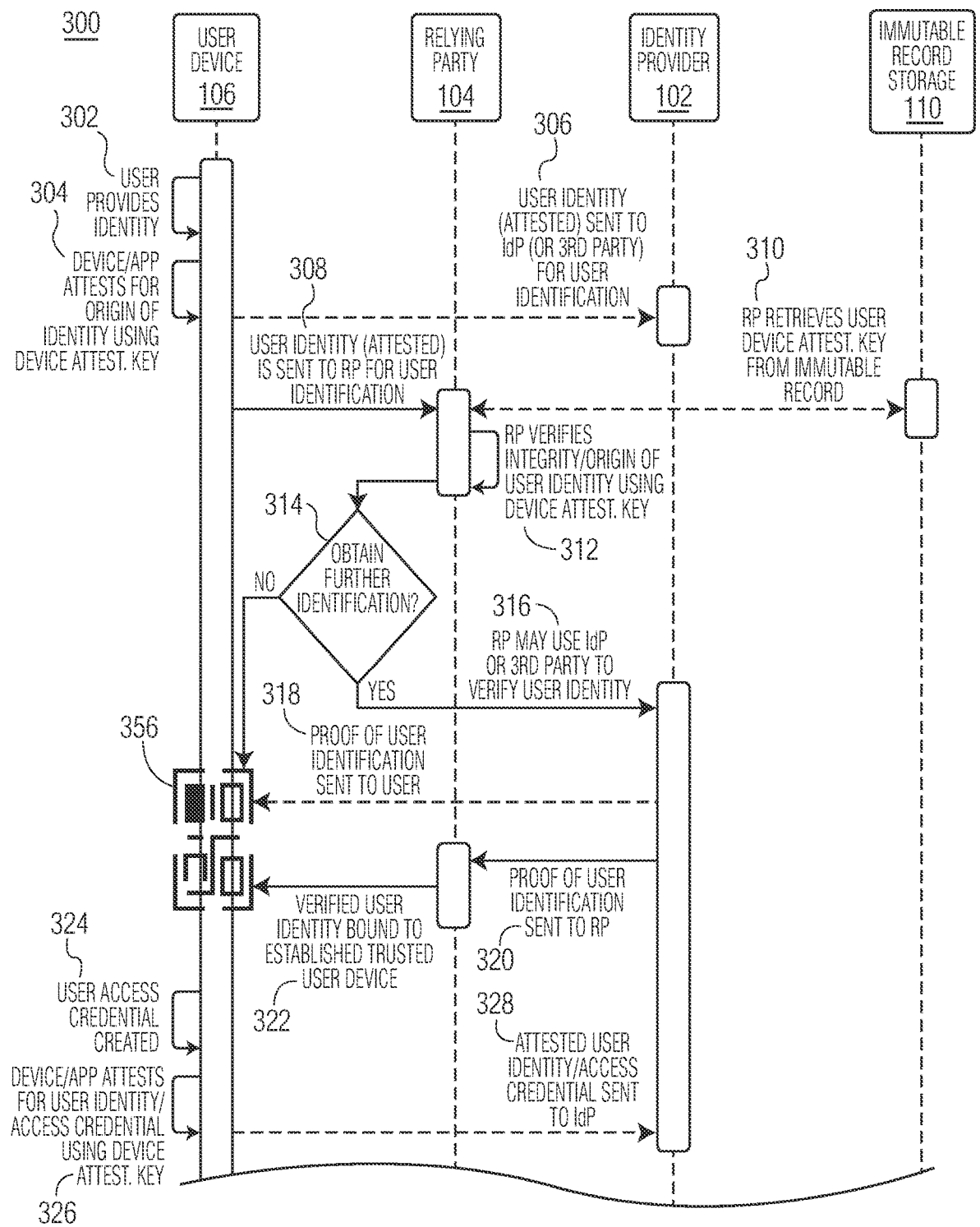

Registration service 112 may be configured to participate in an initial registration of user device 106 (see FIG. 2), user identity proofing of user 108, provisioning of access credentials on user device 106 and establishing of one or more mutually trusted user access credential reference 136 and/or one or more identity attribute(s) 138 on immutable record(s) 132 (stored in immutable record storage 110) (see FIGS. 3A and 3B). In some examples, registration service 112 may also be configured to provision unique user and device identifiers. The user and device identifiers, the user access credentials and/or the user identity attributes may be cryptographically bound to user device 106 (referred to herein as an identity binding), via registration service 112. In some examples, identity provider registration may be optional. For example, registration may be carried out via relying party 104 (e.g., an SP) after being permissioned by identity provider 102. FIG. 1 illustrates that registration service 112 may communicate with immutable record storage 110, for example, for user enrollment.

Optional user database 114 may be configured to store identity data obtained from user device 106 (e.g., provided by user 108 via user device 106 and/or derived by user application 144 on user device 106). The identity data may include, without being limited to, user and/or device identifiers, one or more locations of the user's asset(s) 134 among immutable record(s) 132 (e.g., location(s) of access credential reference(s) 136 and/or identity attribute(s) 138) and/or any other suitable information. User database 114 may be optional in some cases, for example, where access credential reference(s) 136 and identity attribute(s) 138 may be obtained from user device 106 and/or from relying party 104 (e.g., an SP).

Optional identity broker 116 may be configured to receive an authentication and/or authorization request (e.g., from relying party 104 (e.g., an SP), directly from the user's associated computing device (e.g., user device 106) and/or a computing service/device (e.g., computing service 126, computing device 128, etc.). Responsive to the request, identity broker 116 may identify user 108 via user database 114 and may then relay the request to AAS 118. In some examples, identity broker 116 may be optional, such as when relying party 104 (e.g., an SP) may verify or commit a transaction directly via immutable record storage 110 without involvement from identity provider 102.

Optional AAS 118 may be configured to handle one or more authentication and authorization processes. In some examples, AAS 118 may be an optional service that relying party 104 may select when relying party 104, such as when relying party 104 prefers to delegate identity provider 102 to handle access authentication and authorization for user(s) associated with relying party 104. In some examples, AAS 118 may be configured to receive an authentication and/or authorization request from identity broker 116. AAS 118, responsive to the request (from identity broker 116), and using one or more user identifiers, may be configured to verify and validate the authenticity, provenance and/or non-repudiation of the user identity and the access credentials. AAS 118 may be configured to perform the verification and validation using at least one immutable user access credential reference 136 of immutable record(s) 132.

Relying party 104 may include any entity system associated with and providing users (e.g., user 108) with access to one or more resources 124. Relying party 104 (which may include a service provider) represents the owner of one or more resource(s) 124 or resource(s) 124 itself that user 108 may desire to access. At times, for convenience, relying party 104 is also, referred to as service provider 104 and/or as RP/SP 104. Service provider 104 may also be a third party identity provider that may use threat prevention system 100 to provide IAM services to another service provider. Relying party 104 can as well, in some examples, be regarded as a "client." For example, relying parties and/or service provider systems may use the privilege insider threat prevention protocol of the present disclosure to validate and/or verify user identity and transactions for its associated user(s) (e.g., user 108).

In general, a service provider may represent a provider of a resource/service that a consumer (e.g., an end-user and/or an organization) may desire to consume. In this case, the service provider may make the resource/service available to the consumer. For example, an authentication service provider may provide an authentication service to organizations who may use the service to authenticate its users to its own (internal) services and/or for access to other (external) services. A relying party may include any entity that may depend on an identity provider to identify, authenticate and/or authorize access to its services. A service provider may be a relying party when the service provider depends on the identity provider to identify, authenticate and/or authorize its user to access their resources/service. A service provider may also, in some examples, depend on another party (e.g., a relying party) who in-turn may depend on the identity party to provide identification, authentication and/or authorization services to the service provider. In some examples, a service provider may rely directly on the identity provider or indirectly through another party.

Relying party 104 may communicate with user device 106 and immutable record storage 110. In some examples, relying party 104 may communicate with identity provider 102. Relying party 104 may include at least one server 120, at least one database 122 and one or more resources 124. Resource(s) 124 may include at least one computing service 126 and/or at least one computing device 128. In some examples, relying party system 104 may communicate directly with immutable record storage 110, such as for authentication and/or authorization. In some examples, relying party system 104 may use identity provider system 102 (e.g., AAS 118) for authentication, rather than performing the operation itself.

In some examples, one or more of components 120-124 of relying party 104 may communicate with each other via a data and control bus (not shown). In some examples, components 120-124 of relying party 104 may be embodied on a single computing device (e.g., one server 120). In other examples, components 120-124 of relying party 104 may be embodied on two or more computing devices distributed over several physical locations, connected by one or more wired and/or wireless links. In some examples, one or more components of relying party 104 may be associated with a cloud service provider that may provide one or more cloud computing services.

Server 120 may include at least one processor, one or more interfaces (e.g., an electronic device including hardware circuitry, an application on an electronic device) for communication with other components of system 100 (e.g., identity provider 102, user device 106, immutable record storage 110, etc.) and non-transitory memory storing one or more routines and/or algorithms to implement resource(s) 124 as well as the privilege insider threat prevention protocols and functionality of the present disclosure, as described herein. In some examples, server 120 may include a computing system such as computer system 1000 shown in FIG. 10).

It should be understood that relying party 104 refers to a computing system having sufficient processing and memory capabilities (e.g., such as computer system 1000 shown in FIG. 10) to perform the specialized functions described herein.

Database(s) 122 may be configured to store any suitable information relating to one or more users associated with relying party 104. In some examples, the user information may be collected (and/or generated) as part of a registration phase. The user information may include (without being limited to), for example, one or more of a user identity, user credentials, user preferences for one or more particular resource(s) 124, one or more unique user identifiers, user device information and any other suitable information.

Computing service(s) 126 may include any service that desires identification, authentication and/or authorization to access its protected resources. Non-limiting examples of computing service(s) 126 may include web applications, mobile applications, applications on one or more electronic devices (e.g., kiosks, dedicated computing devices, desktop devices, internet of things (IoT) devices, cars, computing devices associated with a physical location/area, etc.). In some examples, computing service 126 may be the same as user device 106.

Computing device(s) 128 may include any device that desires identification, authentication and/or authorization to access its restricted locations. Non-limiting examples of restricted locations may include protected applications, secure storage, websites, servers, remote systems, networks, physical locations, sensitive data and/or any other resources that may desire authorized access such as desktop computers, laptops, tablets, smartphones, wearable devices, IoT devices, remote machines/servers and any other suitable electronic devices. Non-limiting examples of computing device(s) 128 may include, desktop computers, laptops, tablets, smartphones, wearable devices, IoT devices, remote machines/servers and any other suitable electronic devices. In some examples, computing device 128 may be the same as user device 106.

User device 106 may include any device associated with user 108 that can be used to access and/or help to access restricted resources (e.g., computing service(s) 126) and/or access restricted locations (e.g., associated with computing device(s) 128). Non-limiting examples of user device 106 may include desktop computers, laptop computers, tablets, smartphones, wearable devices, IoT devices, and any other suitable electronic devices. In some examples, user device 106 may be the same as computing service 126 and/or computing device 128. User device 106 may include one or more access credentials 140, one or more (optional) identity attributes 142 and user application 144 (also referred to as user app 144).

Although not shown, user device 106 may include non-transitory memory, at least one processor (including machine readable instructions), a communications interface, a user input interface for inputting data and/or information to user device 106 and/or a user display interface for presenting data and/or information on user device 106. In some examples, the user input interface and the user display information may be configured as a graphical user interface (GUI). In some examples, user device 106 may include a computing system similar to computer system 1000 (shown in FIG. 10).

Access credential(s) 140 may include unique user and/or user device secrets that can be used to prove to relying party 104, identity provider 102 and/or any other third party that user 108 is who they claim to be, at any point in time. Access credential(s) 140 may include (without being limited to) one or more cryptographic keys, one or more biometric credentials, one or more passwords, one or more patterns, one or more behavioral attributes, one or more contextual attributes, one or more user unique attributes, one or more device unique attributes and/or any other suitable credentials.

Optional identity attribute(s) 142 may include user identity information associated with user 108 such as (without being limited to) one or more email addresses, one or more phone numbers, at least one identity card, a passport, electronic identity information, user identity data obtained from third party sources such as digital verifiable credentials (e.g., a digital employee reference, one or more digital certificates, a digital passport, a digital driver's license, etc.) and/or other personally identifiable information (PII) that may be used in order to enroll and/or to proof the identity of user 108 to RP/SP 104.

User(s) 108 may include customers (e.g., end users) of relying party 104 that have a mobile or web application (e.g., user application 144) installed on user device 106 (e.g., an application associated with the user). User application 144 may use the threat prevention protocols of the present disclosure to communicate directly with immutable record storage 110. In some examples, user application 144 can communicate with immutable record storage 110 via RP/SP 104 and/or communicate directly with immutable record storage 110. In some examples, user application 144 may communicate with identity provider 102.

Immutable record storage 110 may include at least one access control mechanism 130, and may be configured to store one or more immutable records 132. Each immutable record 132 represents a record of at least one transaction comprising one or more electronic assets 134. In general, a transaction may represent a logical operation, a data value and/or a representation thereof that may be committed to at least one record of immutable record(s) 132. A transaction may be performed by relying party 104, identity provider 102 and/or user device 106 to create, validate, revoke and/or add additional information to immutable record(s) 132. Each immutable record 132 is immutable in that the integrity and authenticity of the record cannot be tampered with. Asset(s) 134 of an immutable record 132 may include at least one access credential reference 136 and, in some examples, one or more optional identity attributes 138.

Non-limiting examples of access credential reference(s) 136 may include a public part of a user device/app attestation key (discussed further below with respect to FIG. 2), a non-sensitive portion of user access credentials (such as a public part of at least one cryptographic key) at least one unique user device identifier, one or more unique user identifiers and the like. Non-limiting examples of identity attribute(s) 138) may include at least one secure cryptographic representation of user identity attribute(s), such as a hash of a user email address, an age, an address, an electronic identity card data, a degree certificate, a driver's license and any other suitable electronic data. Access credential reference(s) 136 may represent authentication data for user 108 and/or user device 106 which can be used by identity provider system 102 and/or relying party system 104 to determine, for example, user identity, user device identity, transaction origin, transaction integrity and/or a user device security state. Identity attribute(s) 138 may represent verifiable user personal information that user 108 may share with other services to register and/or consume resource(s) 124. For example, user 108 may share an indication that the user is over 18 years old without having to share an exact age or other personal date with a service provider. In general, identity attribute(s) 138 (stored in immutable record(s) 132) represent a secure cryptographic representation (e.g., a hash) of identity attribute(s) 142 (optionally stored on user device 106). For example, if identity attribute(s) 142 are shared with resource(s) 124, identity attribute(s) 138 (the secure cryptographic representation stored in immutable record(s) 132) may be used by resource(s) 124 to validate the received identity attribute(s) 142 An example use case is described further below with respect to FIG. 8.

In general, immutable record storage 110 represents one or more computing devices (such as computer system 1000 shown in FIG. 10) configured to store immutable record(s) 132 in a manner that prevents the record(s) 132 from being tampering with (e.g., tampering with integrity, authenticity, etc.). In some examples, components 130-138 of immutable record storage 110 may be embodied on a single computing device. In other examples, components 130-138 of immutable record storage 110 may be embodied on two or more computing devices distributed over several physical locations, connected by one or more wired and/or wireless links. Immutable record storage 110 may include, without being limited to, at least one blockchain network, one or more distributed ledgers and/or write once read many (WORM) storage.

In some examples, immutable record storage 110 may include a blockchain network, where a blockchain may be configured as a collection of peers, and where a peer represents a node in the blockchain network. In the blockchain network, a node may participate in reaching consensus in the network. Clients (such as user device 106), relying parties (such as relying party 104) and/or identity providers (such as identity provider 102) may interact with the blockchain network through the peers. In some examples, relying party 104 and identity provider 102 may represent different nodes of the blockchain network (e.g., comprising immutable record storage 110). In a permissioned blockchain network, a peer's access to the blockchain network may be restricted via permissions and/or roles.

Access control mechanism 130 may be configured to provide access to information (e.g., access credential reference(s) 136, identity attribute(s) 138) in immutable record(s) 132, by one or more parties that are permissioned to access immutable record(s) 132 (e.g., identity provider 102, relying party 104, user device 106, etc.). In general, access control mechanism 130 may be configured to ensure that only trusted and reliable parties (e.g., identity providers such as identity provider system 102, service providers such as relying party 104) can access immutable records 132. Access control mechanism 130 may ensure that privacy and privileges associated with immutable record(s) 132 are preserved. Access control mechanism 130 may be configured to check permissions of any party attempting to access immutable record(s) 132, may determine one or more immutable records 132 that a party has permission to access and may ensure that the party performs a permitted operation. For example, a third party (via access control mechanism 130) may be able to read access credential reference(s) 136 but may not be able to add an access credential to immutable record(s) 132. In another example, access control mechanism 130 may prevent a third party from accessing immutable record(s) 132. As a result, a privilege user may be prevented from adding an unauthorized transaction to a user account. In another example, access control mechanism 130 may prevent privilege insiders from revoking an existing user access credential and/or from creating a new user access credential reference (which could be used to compromise a user account).

In some examples, threat prevention system 100 may be configured to provide a mutual assurance for a transaction, such as via a multi-signature transaction procedure or through other suitable mechanisms. For example, a multi-signature transaction procedure includes more than one signatory to a transaction. If the number of pre-defined signatories (a quorum) is not satisfied, the transaction may be considered incomplete and as a result may be rejected. In some examples, in system 100, identity provider 102, relying party 104 and user 108 (via user device 106) may sign the same transaction and submit the transaction to immutable record 132 via immutable record storage 110 at the point of user registration. The multi-signature transaction procedure assures both identity provider 102 and relying party 104 of the authenticity of user 108 (e.g., via user device 106) and as a result, they (i.e., identity provider 102 and relying party 104) cannot repudiate the user's identity and/or access credentials. The user's involvement ensures that user 108 is in total control of the established identity and in possession of the access credentials. In some examples, either relying party 104 or identity provider 102 can independently verify and validate any user transaction using the user's access credential reference(s) 136 provisioned on immutable record 132. For example, on a blockchain, the blockchain network peers may validate the transaction using the cryptographic keys of identity provider 102 and relying party 104 to achieve mutual assurance. In some examples, user 108 may or may not be involved in the transaction validation.

Some portions of the present disclosure describe embodiments in terms of algorithms and symbolic representations of operations on information. These algorithmic descriptions and representations are used to convey the substance of this disclosure effectively to others skilled in the art. These operations, while described functionally, computationally, or logically, are to be understood as being implemented as data structures, computer programs or equivalent electrical circuits, microcode, or the like. Furthermore, at times, it may be convenient to refer to these arrangements of operations as procedures, protocols, processes or algorithms. The described operations may be embodied in specialized software, firmware, specially-configured hardware or any combinations thereof.

Figure 4:
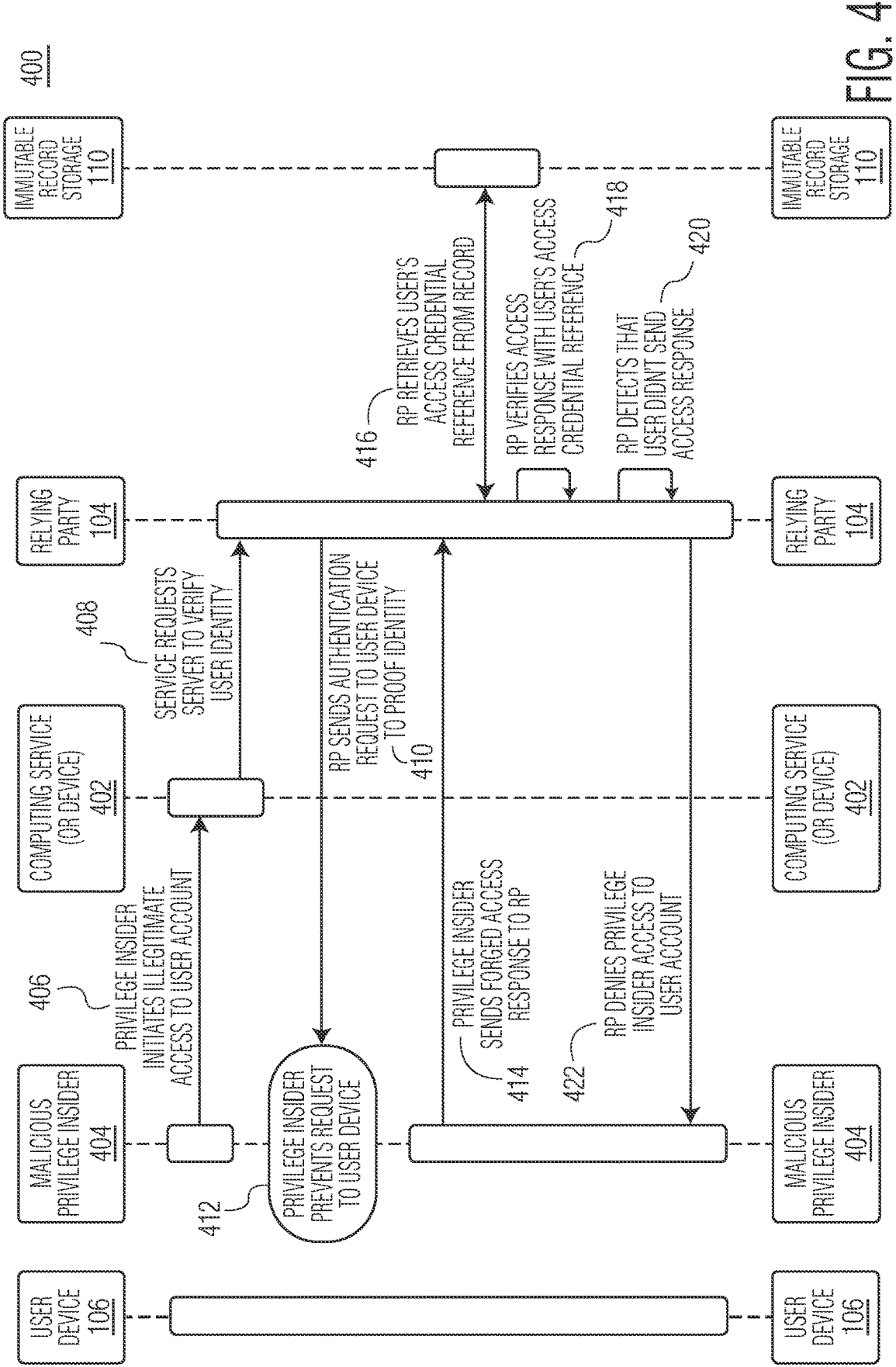
FIG. 4 is a signal flow diagram of an exemplary method of insider threat prevention for the system shown in FIG. 1, according to an aspect of the present disclosure.

Referring next to FIGS. 2-4, signal flow diagrams are shown representing example operations of system 100 including: registration of user device 106 for system 100 (FIG. 2), user identity proofing for system 100 (FIGS. 3A and 3B) and insider threat prevention for system 100 (FIG. 4). In FIG. 2-4, it is understood that some of the steps may be performed by system 100 concurrently with other steps or a combination of steps, or may be performed in a different sequence than shown. It will also be understood that the steps shown in FIGS. 2-4 may be implemented by computer program instructions provided to at least one processor, including, for example, processing device 1002 executing processing logic 1004 (as shown in computer system 1000 of FIG. 10).

In FIGS. 2-9, cylinders 236 represent a syncing ability, indicating that immutable record(s) 132 may, in some examples, be replicated by identify provider system 102 and/or relying party system 104. In some examples, immutable record storage 110 may permit relying party system 104 and/or identity provider system 102 to synchronize at least a portion of immutable record(s) 132, thereby allowing identify provider system 102 and/or relying party system 104 to synchronize and store the (portion of) synchronized record(s) 132 within its infrastructure (e.g., database 122) for improved performance. For example, the synchronization may allow identify provider system 102 and/or relying party system 104 to verify at least a portion of information in immutable storage 110 locally rather than through the immutable record storage 110 (e.g., verification through a blockchain), thereby improving the speed of system 100 to verify information and provide faster identification, authentication and/or authorization operations to end-users. In general, the syncing ability represented by cylinders 236 represents an optional feature that may or may not be performed by system 100.

Referring to FIG. 2, a signal flow diagram of an exemplary method 200 of registering user device 106 for insider threat protection system 100 is shown, according to aspects of the present disclosure. The example user device registration process may be performed between user device 106, relying party 104 (e.g., a service provider), identity provider 102 and immutable record storage 110. The user device registration process shown in FIG. 2 is part of an overall registration process including two parts—device registration (described below with respect to FIG. 2) and user identity proofing (described below with respect to FIGS. 3A and 3B).

At step 202, user application 144 may be downloaded and installed and/or accessed on user device 106 (e.g., by user 108). Non-limiting examples of user application 144 may include computer applications, web pages, mobile application and the like. In some examples, user application 144 may be owned by service provider 104 or by a third party. At step 204, user application 144 may verify a user device security of user device 106 (e.g., that user device 106 is secure enough to run user application 144). For example, user application 144 may confirm whether user device 106 is rooted, jailbroken and/or whether user device 106 is protected with an authentication factor such as a passcode, pattern, biometric or possession of a unique identifier (e.g., a certificate). At step 206, user application 144 may create at least one unique device attestation credential such as a pair of cryptographic keys (e.g. public and private keys) or a secret (also referred to herein as a user device/app attestation credential).

At optional step 208, identity provider 102 may provide a unique attestation challenge to user device 106 (and/or user application 144) installed on user device 106. This unique challenge may be used to prevent another device and/or application from using a previously used attestation to deceive and/or impersonate user device 106 (i.e. replay attack prevention). In some examples, user device 106 (and/or user application 144) may use another method (such as a digital certificate) to prevent replay attacks and/or man-in-the-middle attacks. In such cases, a challenge from identity provider 102 (i.e., step 208) and/or relying party 104 may not be used.

At step 210, user device 106 (and/or user application 144) may use the unique device attestation credential(s) (e.g. using the device/app attestation credential private key, as established at step 206) to create an attestation to vouch to identity provider 102 and/or relying party 104 of the security (i.e., integrity, authenticity and trustworthiness) of user device 106 (and/or user application 144). At optional step 212, user device 106 (and/or user application 144) may send the attestation (created at step 210) directly to identity provider 102. User device 106 may also store device attestation information, such as the device attestation credential(s) (established at step 206) and/or the attestation (created at step 210). In some examples, the stored device attestation information may be stored in user device 106 as access credential(s) 140 (FIG. 1). In some examples, the attestation may not be stored in user device 106. For example, a new attestation may be created using the device attestation credential(s) whenever an attestation is desired.

At step 214, user device 106 (and/or user application 144) may send the attestation to identity provider 102 (e.g., via relying party 104). At step 216, relying party 104 may verify the received attestation (e.g. using the public key of the device/app attestation credential established at step 206) to ensure user device 106 (and/or user application 144) is in possession and control of the attestation credentials (e.g. private key). At step 218, relying party 104 may send the received attestation to identity provider 102.

At step 220, identity provider 102 may verify the received attestation (e.g. using the device/app attestation public key established at step 206) to ensure user device 106 (and/or user application 144) is in possession and control of the attestation credentials (e.g. the private key). At step 222, (i.e., when the received attestation is verified) identity provider 102 may register the attested and verified user device on immutable record 132 of immutable record storage 110. The device registration may not be valid until the registration is validated by relying party 104 and authorized by user device 106 (this is to achieve a multi-party authorization ensuring that a singular entity unilaterally cannot alter, manipulate and/or change the user device attributes).

At optional step 224, relying party 104 may validate the user device registration on immutable record 132 of immutable record storage 110.

At step 226, user 108 may prove possession and control of user device 106 (and/or user application 144) to authorize the registration of user device 106. For example, user 108 may provide user input via user device 106 of predetermined user information associated with user 108 to prove possession and control of user device 106 (and/or user application 144). At step, 228, user 108, via user device 106 (and/or user application 144) may authorize the device registration directly on immutable record 132 of immutable record storage 110.

At step 230, immutable record storage 110 may continuously check whether the quorum has been satisfied to validate the user device registration. When it is determined, at step 230, that the quorum is not satisfied, user device 106 remains in a pending state, and step 230 proceeds to step 234. In general, a resource 124 (a client) may be associated with one or more relying parties. In some examples, one client could be associated with multiple relying parties, such as one relying party for each web application. In some examples, identity provider system 102 and/or relying party system 104 may be assigned roles (permissions) in immutable record storage 110. With, for example, a peer role, relying party system 104 may create its account(s) on immutable record storage 110. In the account(s) of relying party system 104, relying party system 104 may set the number of signatories (i.e., a quorum) depending on its security requirements. The quorum may be stored in the account(s) of relying party system 104 on immutable record storage 110. Whenever a device/user account that belongs to relying party system 104 is created, immutable record storage 110 may ensure that the quorum defined on the account(s) of relying party system 104 is satisfied. Otherwise, the transaction may be rejected.

When it is determined, at step 230, that the user device registration is validated and the user device registration is completed, step 230 may proceed to step 232. At step 232, the successfully registered user device 106 (and/or user application 144) may be established as a trusted user device (and/or user application, generally designated as trusted user device/app 106). The number of parties used to successfully register user device 106 (at step 230) may depend on a pre-defined quorum. For example, relying party 104 may decide not to participate in the registration process. In the same way, identity provider 102 and/or user device 106 may as well, not participate in validating the user device registration on immutable record storage 110.

Referring to FIGS. 3A and 3B, a signal flow diagram of an exemplary method 300 of user identity proofing for insider threat protection system 100 is shown. In general, the user identity proofing shown in FIGS. 3A and 3B may involve obtaining a user identity, optionally obtaining further user identification, user identity verification, user identity binding and provisioning of the verified user identity on immutable record 132 of immutable record storage 110. The example user identity proofing process may be performed between user device 106, relying party 104 (e.g., a service provider), identity provider 102 and immutable record storage 110. As discussed above, the user identity proofing may be part of an overall device registration process performed by system 100.

At step 302, user 108 may provide user input indicating the user's identity on user application 144 (via user device 106) as part of the registration process. In some examples, user device 106 may be the same as computing device 128 and/or computing service 126. The user identity may include for example, an email address, an identity card, a passport, one or more electronic identities (e.g., e.g., a digital driver's license, a digital passport, one or more identity assertions from third party sources) and/or any other document that can be used to uniquely identify and verify the user identity. At step 304, trusted user device/App 106 (see step 232 in FIG. 2) may attest for the origin and provenance of the user identity (obtained at step 304). Step 304 may ensure identity provider 102 and/or relying party 104 that the user identity was indeed obtained on trusted user device/app 106 (i.e., based on user device registration process 200 shown in FIG. 2). In some examples, other methods such as a digital certificate may be used to attest to the user identity.

At optional step 306, trusted user device/app 106 may send the user identity directly to identity provider 102 (and/or a third party identity provider) for user identification and verification. When user application 144 is owned by relying party 104, trusted user device/app 106, at step 308, may send the user identity directly to relying party 104 for user identification and verification.

At optional step 310, relying party 104 may obtain the trusted user device attestation credential (e.g. a public key) from immutable record 132 in immutable record storage 110. At step 312, relying party 104 may verify the origin and integrity of the received user identity (which, in some examples, may use the trusted user device attestation credential retrieved from immutable record storage 110 at step 310).

At step 314, relying party 104 may determine whether to obtain further user identification and verification. If, at step 314, it is determined to obtain further identification and verification, step 314 proceeds to step 316. At step 316, relying party 104 may forward the user identity to identity provider 102 and/or a third party for verification. At optional step 318, proof of the (further) user identification and verification may be sent by identity provider 102 (and/or a third party) directly to trusted user device/app 106 using any suitable communication method such as via quick response (QR) code 356, deep-linking and others.

If, at step 314, it is determined that no further identification and verification is desired, relying party 104 may send proof of the verified user identity (determined at step 312) directly to trusted user device/app 106, and step 314 may proceed to step 320.

At step 320, proof of user identification and verification may be sent by identity provider 102 (and/or a third party)

to relying party 104. At step 322, relying party 104 may send a proof of the user identification and verification status to trusted user device/app 106 using any suitable communication method (such as via QR code 356), deep-linking and/or other methods) to bind the verified user identity to trusted user device/app 106.

At step 324, when the user identity is successfully verified, user application 144 may create an access credential for user 108 locally on (trusted) user device 106. In some examples, the access credential may be a set of public and private cryptographic keys. The verified user identity, the unique device identifier(s) and the user access credential(s) may be configured to be cryptographically bound to user device 106 and/or user 108. In some examples, the user access credential(s) may be stored in user device 106, such as part of access credential(s) 140 (FIG. 1). In some examples, the user access credential(s) may be created in such a manner that the credential(s) cannot be removed from user device 106, and such that relying party 104 and/or identity provider 102 do not have access to the user access credentials.

At step 326, trusted user device/app 106 may attest for one or more of the origin, provenance, authenticity and integrity of the user identity and/or the access credentials (e.g. using the device attestation key). Step 326 may ensure identity provider 102 and/or relying party 104 that the user identity and/or access credentials were indeed created on trusted user device/app 106 and that the user is in possession and control of the identity and/or access credentials.

At optional step 328, trusted user device/app 106 may send a verifiable proof of the user identity and/or access credentials directly to identity provider 102. The proof may include, for example, user identity attributes and/or access credentials (such as the public part of a cryptographic key) cryptographically signed with the device/app attestation key created on user device in step 210 of the user device registration process (shown in FIG. 2).

At step 330, trusted user device/app 106 may send a verifiable proof of the user identity and/or access credentials to relying party 104. The proof may include, for example, user identity attributes and/or access credentials (such as the public part of a cryptographic key) cryptographically signed with the device/application attestation key created on user device 106 in step 210 of the user device registration process (shown in FIG. 2).

At optional step 332, relying party 104 may obtain the verification credentials, for example, the device attestation credential (e.g. the public part of a cryptographic key) from immutable record 132 of immutable record storage 110. In some cases, the verification credentials (e.g. the public part of a cryptographic key) may be received from trusted user device/app 106 as part of the verifiable proof (in step 330).

At step 334, relying party 104 may verify the received verifiable proof of the user identity and/or access credentials, for example, by using the device attestation credential (e.g. the public part of a cryptographic key) obtained from immutable record 132 of immutable record storage 110. In some cases, relying party 104 may use a verification credential (e.g. the public part of the cryptographic key) received from the device/application as part of the verifiable proof (in step 330) to verify the proof.

At step 336, relying party 104 may forward the received verifiable proof to identity provider 102 and/or a third party (e.g. another IdP). Step 336 may occur, for example, where relying party 104 delegates its user(s)' IAM to a third party and/or when an additional party (e.g. an IdP) is used to satisfy the user registration condition (quorum).

At optional step 338, identity provider 102 may obtain the verification credential(s), for example, the device attestation credential (e.g. the public part of a cryptographic key) from immutable record 132 of immutable record storage 110. In some cases, the verification credential(s) (e.g. the public part of a cryptographic key) may be received from relying party 104 as part of the verifiable proof (in step 336).

At step 340, identity provider 102 may verify the received verifiable proof of the user identity and/or access credentials, for example, by using the device attestation credential (e.g. the public part of a cryptographic key), that may be obtained, in some examples from immutable record storage 110 (e.g. in optional step 338). In some cases, identity provider 102 may use verification credential(s) (e.g. the public part of the cryptographic key) received from the RP as part of the verifiable proof (in step 336) to verify the proof.

At step 342, identity provider 102 may register (e.g., write) the user identity and/or access credential reference to immutable record 132 in immutable record storage 110. Immutable record 132 may be added to the record of the user's registered trusted device (as in step 222 of the user device registration process shown in FIG. 2).

In some examples, when the user registration includes multi-party authorization (multi-signature), optional steps 344-348 may be included in method 300. The number of parties involved may depend on a pre-defined authorization conditions (quorum). At optional step 344, relying party 104 may validate the user identity and/or access credential reference on immutable record 132 of immutable record storage 110. At optional step 346, user 108 may prove possession and control of the user identity and/or access credentials (via user input into user device 106) to authorize user device 106 to be registered on immutable record storage 110. At optional step 348, trusted user device/app 106 may authorize the user identity and/or access credentials (sent to relying party in step 330) on immutable record storage 110. Optional step 348 may include, for example, writing a verifiable proof of the user identity attributes and/or access credentials to immutable record storage 110. The verifiable proof may be, for example, cryptographically signed with the user credentials (e.g. a private key) created in step 324. The verifiable proof proves to all the parties involved that user 108 is indeed, in possession and control of trusted user device/app 106 and the user identity and/or access credentials.

At step 350, access control mechanism 130 (e.g., a security control feature) of immutable record storage 110 may be configured to confirm whether a pre-defined registration condition is satisfied. When, at step 350, the pre-defined registration condition is not satisfied, immutable record 132 of immutable record storage 110 may be invalidated (at step 354) and the account may be considered pending, for example, for a predetermined time period (e.g., several, seconds, several minutes, etc.). In some examples, when the pre-defined registration condition is not satisfied for greater than the pre-determined time period, the immutable record 132 may not be validated and the registration may be rejected.

When the pre-defined registration condition is satisfied, at step 350, immutable record 132 may be validated (step 352). The pre-defined registration condition may be specified by relying party 104 and/or identity provider 102. For example, relying party 104 may decide not to participate in the registration process. In the same way, identity provider 102 and/or user device 106 may as well, not participate in validating the user identity and/or access credentials registration on immutable record storage 110. If the pre-defined registration condition is satisfied, the user registration is completed.

Optional steps 344-348 may assure both identity provider 102 and relying party 104 of the authenticity of user 108 and as a result, they (identity provider 102 and relying party 104) cannot repudiate the user identity and/or access credentials. Either relying party 104 or identity provider 102 (and/or any 3rd party) can independently verify and validate any user transaction using the user's access credential reference provisioned on immutable record storage 110. Moreover, both identity provider 102 and relying party 104 cannot alter and/or destroy the user access credentials on the immutable record.

Referring to FIG. 4, a signal flow diagram of an exemplary method 400 of privilege insider threat prevention for insider threat protection system 100 is shown. The example privilege insider threat prevention process 400 may be performed between malicious privilege insider 404 (also referred to as insider 404), computing service 402 (such as computing service 126 and/or a computing device such as computing device 128 of relying party 104) associated with user 108 (e.g., a service provider) and immutable record storage 110. In FIG. 4, insider 404 pretends to be user 108 (associated with user device 106). FIG. 4 also illustrates that user device 106 is not part of the threat protection process, but is still prevented from the attempted privilege insider attack by insider 404.

At step 406, malicious privilege insider 404 desiring to have illegitimate access to computing service 402 (and/or a computing device) associated with user 108 may initiate an illegitimate access request on the intended computing service (device) 402 pretending to be user 108 (i.e., the owner of an account associated with computing service (device) 402). In some examples, insider 404 may be an identity provider insider and/or a relying party insider.

At step 408, computing service (device) 402 may send a request to relying party 104 (e.g., to server 120 of relying party 104) to verify the user identity. At step 410, relying party 104 may attempt to send an authentication request (challenge) to user device 106 to obtain (proof) the user identity. The challenge may, for example, be sent through a notification or by displaying a QR code. In some examples, the response maybe sent via identity provider 102.

At step 412, insider 404 (e.g., within relying party 104 and/or identity provider 102) may prevent the authentication request from reaching user device 106 (e.g., by intercepting the authentication request). At step 414, insider 404 may send a forged authentication (access) response to relying party 104. This forged response may be for example, a previous authentication response from user device 106 (i.e., a replay attack), a response from the device of insider 404 and/or a response to relying party 104 that user 108 has authenticated (this is typically the case with a conventional delegated authentication method, where an identity provider only sends a status response to a relying party). In some cases, the response from insider 404 (at step 414) may be sent to identity provider 102.

At step 416, relying party 104 (and/or identity provider 102) may retrieve the corresponding user identity and/or access credentials referenced from immutable record storage 110. At step 418, relying party 104 may verify the authentication response (received in step 314) with the access credentials referenced from immutable record storage 110. In some examples, the authentication response may be verified by identity provider 102.

At step 420, relying party 104 (and/or identity provider 102) may detect that the authentication response was not sent by user 108. In some examples, the detection may include, for example, using the trusted user device/app attestation credentials (e.g. the public part of the device attestation key created during the user device registration process described above with respect to FIG. 2) to verify whether the response indeed originated from the trusted user device 106. In some examples, the detection may include, for example, using the user's access credential(s) (created in step 324 in the user identity proofing process described above with respect to FIGS. 3A and 3B) to verify whether the authentication response (verifiable proof) was indeed, authorized by user 108 on the user's trusted device/app 106. In some examples, the detection may include verifying whether the authentication response is unique and not a replay from a previous user transaction.

At step 422, relying party 104 (and/or identity provider 102) may deny insider 404 access to the user account (of user 108) when relying party 104 (and/or identity provider 102) determines that the verifiable proof (access response) did not originate and/or was not authorized by user 108 of user device 106.

Figure 7:
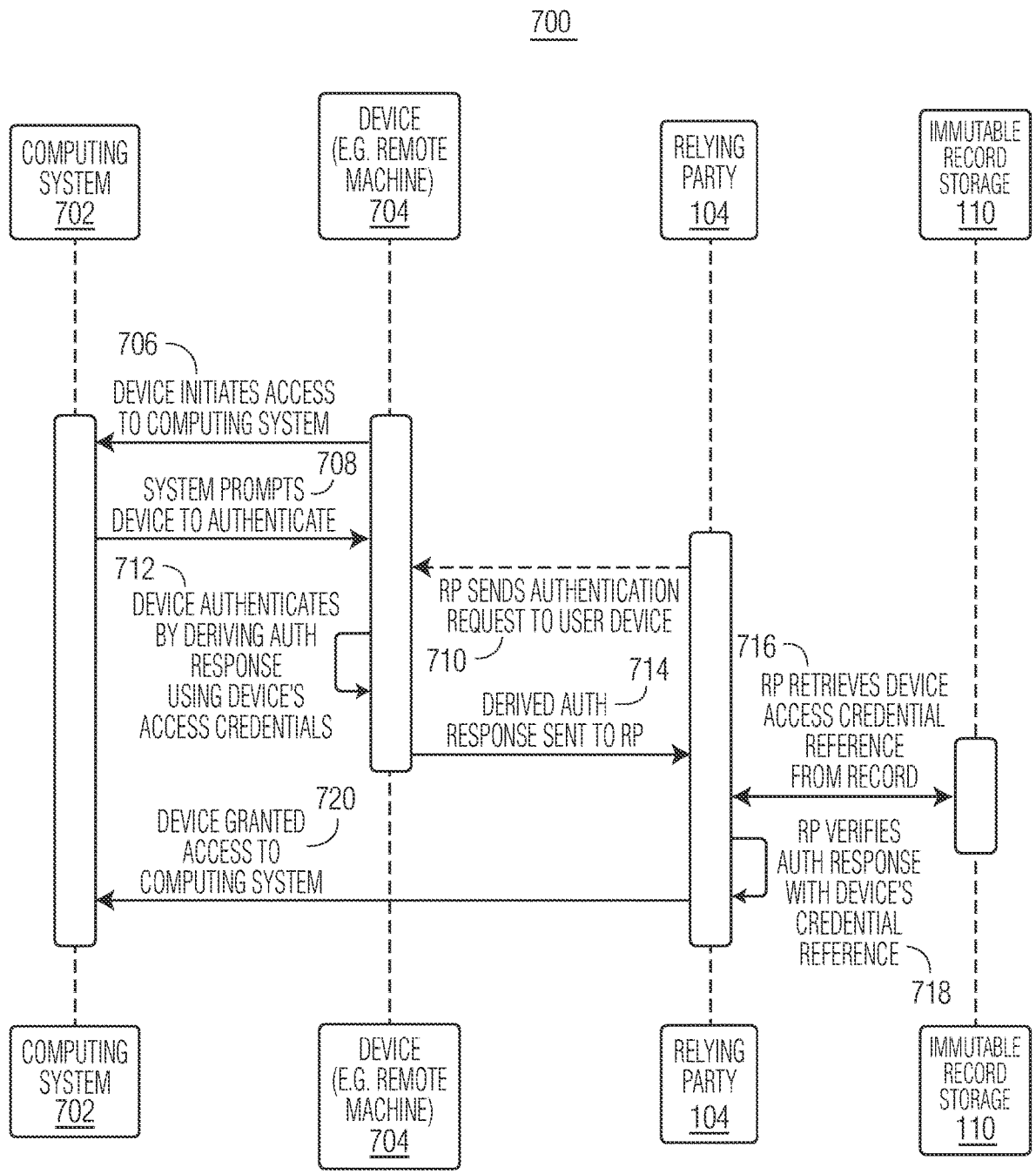
FIG. 7 is a signal flow diagram of an exemplary method of device authentication and/or authorization for the system shown in FIG. 1, according to an aspect of the present disclosure.
Figure 8:
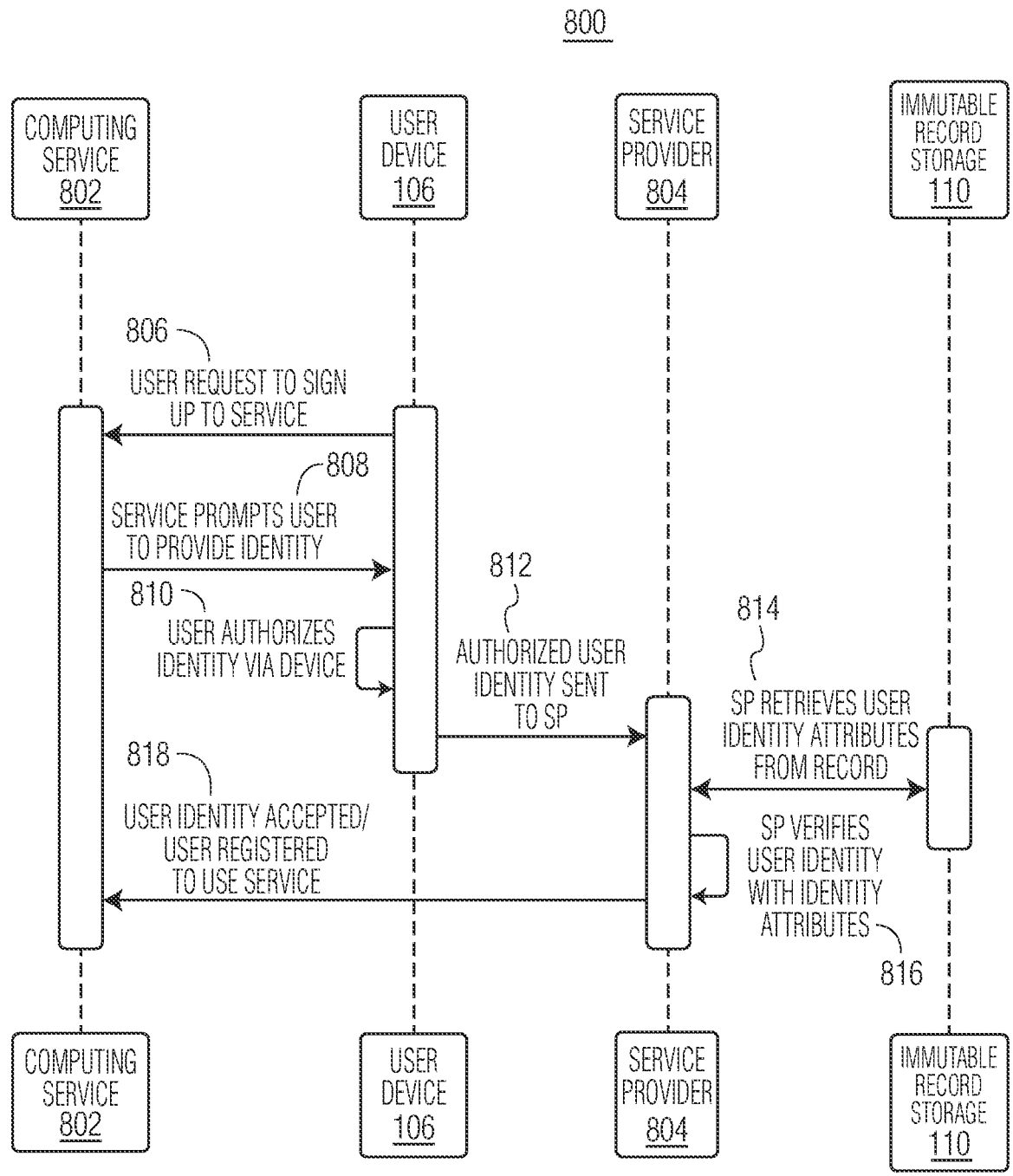
FIG. 8 is a signal flow diagram of an exemplary method of user identity proofing for the system shown in FIG. 1, according to another aspect of the present disclosure.
Figure 9:
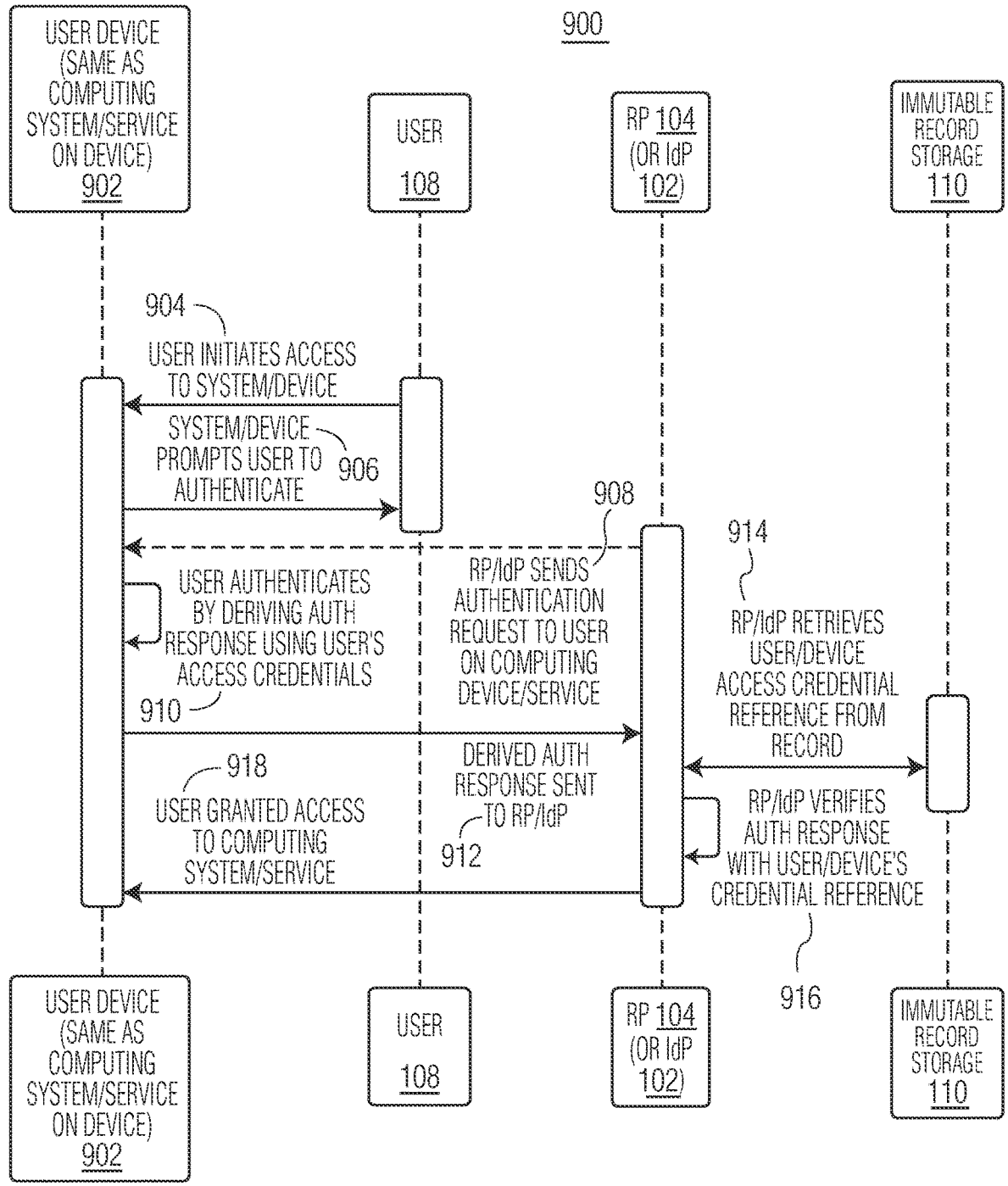
FIG. 9 is a signal flow diagram of an exemplary method of authentication and/or authorization for the system shown in FIG. 1, where a user device is the same as a computing device/service on a computing device, according to an aspect of the present disclosure.

Referring next to FIGS. 5-9, signal flow diagrams are shown representing example use cases of system 100 including: multi-party authorization for system 100 (FIG. 5), user authentication and/or authorization for system 100 (FIG. 6), device authentication and/or authorization for system 100 (FIG. 7), user identity proofing for system 100 (FIG. 8), and authentication and/or authorization for system 100 where user device 902 is the same as a computing device/service (FIG. 9). In FIG. 5-9, it is understood that some of the steps may be performed by system 100 concurrently with other steps or a combination of steps, or may be performed in a different sequence than shown. It will also be understood that the steps shown in FIGS. 5-9 may be implemented by computer program instructions provided to at least one processor, including, for example, processing device 1002 executing processing logic 1004 (as shown in computer system 1000 of FIG. 10).

Figure 5:
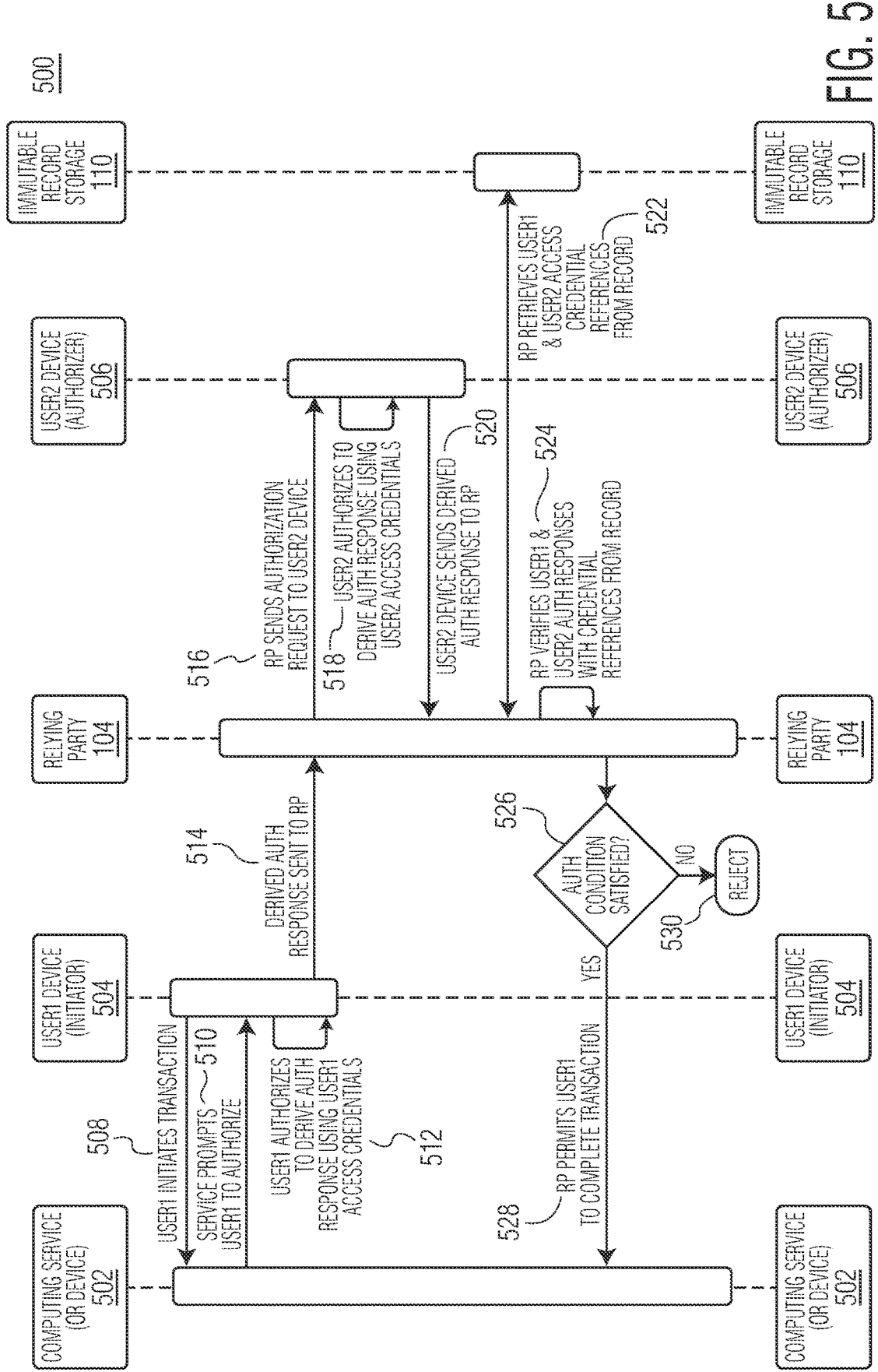
FIG. 5 is a signal flow diagram of an exemplary method of multi-party authorization for the system shown in FIG. 1, according to an aspect of the present disclosure.

Referring to FIG. 5, a signal flow diagram of exemplary method 500 of multi-party authorization for privileged insider threat prevention system 100 is shown. The example multi-party authorization process 500 may be performed between computing service (or computing device) 502, user1 device 504 (associated with a first user designated user1), relying party 104 (e.g., a service provider), user2 device 506 (associated with a second user designated user2) and immutable record storage 110. In FIG. 5, it is assumed that user1 device 504 and user2 device 506 have been previously registered by system 100.

Multi-Party Authorization (MPA) is a secure transaction authorization mechanism that involves more than one person to authorize a privileged transaction. The number of signatories used to complete a transaction may depend on one or more pre-defined conditions by relying party 104. In one example, the number of signatories may be pre-determined by the organization's access control security policy. For example, a system administrator may have permission to make changes to a system, but the changes may take effect when authorized by more than one (1) person.

At step 508, first user (user1, an initiator) may initiate a transaction with computing service (device) 502 via user1 device 504. At step 510, computing service (device) 502 may prompt the initiator (user1) to authorize (via user1 device 504). In some examples, the prompt to authorize may include presenting a QR Code to user1 to scan via user1 device 504. In some examples, the prompt to authorize may be sent from relying party 104, for example via a push notification. In some examples, the prompt to authorize may be sent from identity provider 102, for example, where relying party 104 delegates IAM operations to identity provider 102 and/or to another third party.

At step 512, user1 (the initiator) may authorize, on (registered) user1 device 504, derivation of an authorization (auth) response using the access credential(s) of user1. In some examples, the authorization may include using other authentication factors such as (without being limited to) one or more biometric factors, at least one passcode, at least one pattern, etc. to unlock a computing device and/or application associated with computing service (device) 502.

At step 514, the derived authorization response may be sent from user1 device 504 to relying party 104. In some examples, the authorization response may be a digital signature created using the user1 access credentials provisioned on user1 device 504 at registration. In some examples, the authorization response may be sent to identity provider 102, such as where relying party 104 delegates IAM operations to identity provider 102 and/or to another third party.

At step 516, relying party 104 (or identity provider 102) may send the authorization request to one or more authorizers (illustrated in FIG. 5 collectively as user2 device 506). In some examples, the number of authorizers (e.g., user2 device 506) may include plural authorizers (e.g., more than one). In some examples, the number of authorizers (e.g., user2 device 506) may depend on any pre-defined security conditions of relying party 104 and/or on a sensitivity of the transaction (e.g., adaptive and/or risk-based authentication). For example, a higher number of authorizers may be desired for transactions with higher security and/or sensitivity concerns, whereas a lower number of authorizers may be suitable for transactions with lower security and/or sensitivity concerns. In some examples, the authorization request (at step 516) may be sent at the same time with that of the initiator (user1 device 504, at step 510) (e.g., based on a pre-defined set (one or more) of authorizers (user2's). In some examples, the authorization request (at step 516) may be sent separately from relying party system 104 and/or identity provider system 102 as a push notification. For example, if relying party system 104 determines that the identity of user1 device 504 (the initiator) should be verified prior to requesting that the authorizer(s) (user2 device(s) 506) authorize the transaction, relying party system 104 (and/or identity provider system 102) may send an authorization request to the authorizer(s) (user2 device(s) 506) after user1 device 504 (the initiator) has been verified.

At step 518, the authorizer(s) (e.g., user2) may authorize, on their respective registered device(s) (e.g., user2 device 506), to derive an authorization response using their associated (e.g., user2) access credentials. In some examples, the authorization (at step 518) may include using other authentication factors such as (without being limited to) one or more biometric factors, at last one passcode, at least one pattern, etc. to unlock a computing device and/or application associated with computing service (device) 502. At step 520, the derived authorization (auth) response from the authorizers (e.g., user2 device 506) may also be sent to relying party 104 (or identity provider 102). In some examples, the authorization (auth) response (at step 520) may include a digital signature created using the user access credentials (e.g., associated with user2) provisioned on the associated user device (e.g., user2 device 506) at registration.

At step 522, relying party 104 (or identity provider 102) may retrieve the initiator (i.e., user1) and the other authorizer(s) (e.g. user2) access credential references from immutable record storage 110. In some examples, relying party 104 (or identity provider 102) may retrieve the access credential references (for the initiator and the authorizer(s)) separately. In some examples, relying party 104 (or identity provider 102) may retrieve the access credentials (for the initiator and the authorizer(s)) at the same time. In some examples, relying party 104 (or identity provider 102) may execute the validation directly on immutable record storage 110, by providing the authorization responses from the initiator and the authorizer(s) to a pre-defined function on immutable record storage 110 to validate.

At step 524, relying party 104 (or identity provider 102) may verify and validate the initiator and authorizer(s) authorization responses using the retrieved access credential references (retrieved at step 522). At step 526, relying party 104 (or identity provider 102) may determine whether at least one pre-defined transaction authorization condition is satisfied.

When, at step 526, it is determined that the pre-defined condition(s) is satisfied, step 524 may proceed to step 528 At step 528, relying party 104 (or identity provider 102) may permit user1 (the initiator), via user device, to complete the intended transaction (initially requested at step 508). When, at step 526, it is determined that the predefined condition(s) is not satisfied, the transaction may be rejected at step 530.

Figure 6:
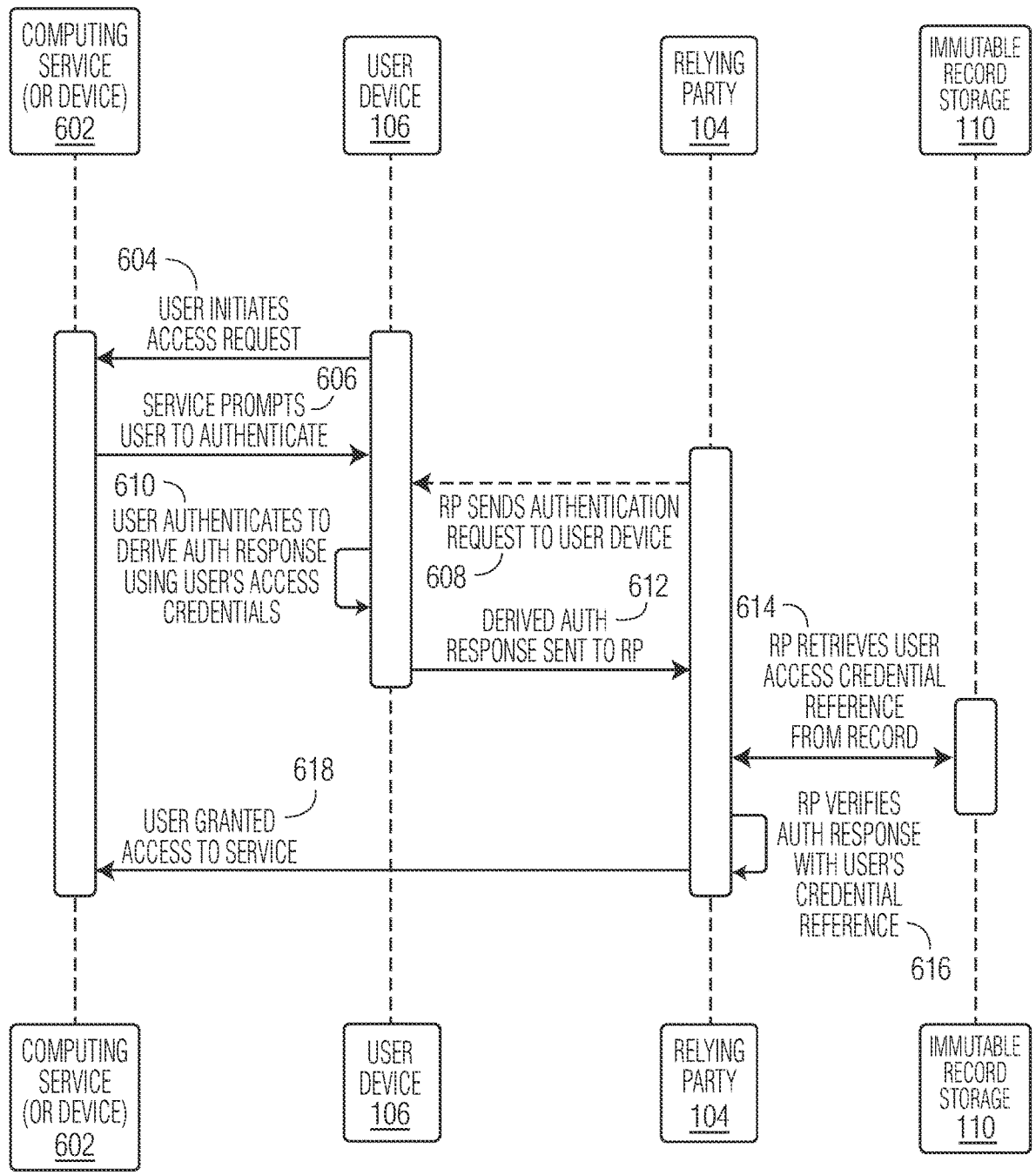
FIG. 6 is a signal flow diagram of an exemplary method of user authentication and/or authorization for the system shown in FIG. 1, according to an aspect of the present disclosure.

Referring to FIG. 6, a signal flow diagram of exemplary method 600 of user authentication and/or authorization for privileged insider threat prevention system 100 is shown. The example process 600 may be performed between computing service (or computing device) 602, user device 106, relying party 104 (e.g., a service provider) and immutable record storage 110. In FIG. 6, it is assumed that user device 106 has been previously registered by system 100.

At step 604, user 108 may communicate with computing service (device) 602 to initiate an access request, via user device 106 and/or directly on computing service (device) 602. At step 606, computing service (device) 602 may prompt user 108 to authenticate and/or authorize. For example, computing service (device) 602 may present a QR code to user 108 to scan with user device 106 and/or by authenticating/authorizing directly on computing service (device) 602 such as using one or more biometric factors, contextual attributes, etc.).

At optional step 608, relying party 104 may send the authentication and/or authorization request (prompt) to user device 106 (e.g., instead of the computing service (device) 602 in step 604), for example, via a PUSH notification. In some example, identity provider 102 may be the one to send the authentication and/or authorization request (prompt) to user device 106 (e.g., instead of the computing service (device) 602 in step 604). For example, identity provider 102 may send the request (prompt) where relying party 104 delegates IAM operation to identity provider 102). In some example the authentication and/or authorization request (prompt) is on the same computing device/service (such as where user device 106 is the same as computing service (device) 602).

At step 610, user 108 may authenticate and/or authorize, on registered user device 106 and/or directly on computing service (device 602), to derive an authentication and/or authorization response using the user's access credentials. In some examples, the authentication and/or authorization may include using other authentication factors such as (without being limited to) one or more biometric factors, at last one passcode, at least one pattern, etc., to unlock a computing device and/or application associated with computing service (device) 602. In some examples, the number and/or type of authentication factors may depend on any SP security conditions of relying party 104 and/or on a sensitivity of the authentication/authorization request (e.g., adaptive and/or risk-based authentication).

At step 612, the derived authentication and/or authorization response may be sent from user device 106 to relying party 104. In some examples, the authorization response (at step 612) may be sent to identity provider 102. In some examples, the authorization response (at step 612) may be a digital signature created using the user access credentials provisioned on user device 106 at registration.

At step 614, relying party 104 (or identity provider 102) may retrieve the user's access credential reference from immutable record storage 110. In some examples, relying party 104 (or identity provider 102) may execute the validation directly on immutable record of immutable record storage 110, by providing the authorization response to a pre-defined function on immutable record storage 110 to validate.

At step 616, relying party 104 (or identity provider 102) may verify and validate the authentication and/or authorization responses using the retrieved access credential references (obtained at step 614). At step 618, relying party 104 (or identity provider 102) may grant user 108 access to the intended resource(s) (e.g., service(s), location(s)) and/or to authorize a transaction (indicated in the access request of step 604), when pre-defined authentication and/or transaction authorization condition(s) are satisfied (at step 616). When the pre-defined authentication and/or authorization condition(s) are not satisfied (at step 6160, the access request may be rejected.

Referring to FIG. 7, a signal flow diagram of exemplary method 700 of device authentication and/or authorization for privileged insider threat prevention system 100 is shown. The example process 700 may be performed between computing system 702, device 704 (e.g., a remote machine), relying party 104 (e.g., a service provider) and immutable record storage 110. In FIG. 7, it is assumed that device 704 has been previously registered by system 100.

At step 706, device 704 (e.g. a remote machine) may initiate an access request by sending the access request to computing system 702. For example, device 704 may want to communicate with another device and/or computing system (e.g., machine-to-machine communication, IoT devices communication, application interface communication, physical access control systems communication, physical door access, etc.).

At step 708, computing system 702 (e.g. a remote server, a physical device and the like) may prompt device 704 to authenticate. In some examples, the prompting (in step 708) may include machine-to-machine communication. At optional step 710, in some examples, relying party 104 (rather than computing system 702) may send the authentication request to device 704 (such that optional step 710 may be performed in place of step 708).

At step 712, device 704 may authenticate by deriving an authentication response using the access credentials of device 704. In some examples, depending on the security conditions of relying party 104 and/or on the sensitivity of computing system 702, the authentication (in step 712) may include proving possession of the device access credentials.

At step 714, the derived authentication response may be sent from device 704 to relying party 104. In some examples, the authentication response may include a digital signature created using the device access credentials provisioned on device 704 at registration.

At 716, relying party 104 (and/or computing system 702) may retrieve the device's access credential reference from immutable record storage 110. In some examples, relying party 104 (and/or computing system 702) may execute the validation directly on an immutable record of immutable record storage 110, by providing the authentication response to a pre-defined function on the immutable record to validate.

At step 718, relying party 104 (and/or computing system 702) may verify and validate the authentication response (received at step 714) using the retrieved device access credential reference (obtained at step 716). At step 720, relying party 104 (and/or computing system 702) may grant device 704 access to the intended resources e.g. computing service(s), location(s) and/or to authorize a transaction (such as one or more system configuration changes), when at least one pre-defined authentication and/or transaction authorization condition (at step 718) is satisfied. When the pre-defined authentication and/or authorization condition(s) are not satisfied at step 718, the access request may be rejected, and access by device 704 may be denied.

Referring to FIG. 8, a signal flow diagram of exemplary method 800 of user identity proofing for privileged insider threat prevention system 100 is shown. The example process 800 may be performed between computing service 802, user device 106, service provider 804 (e.g., the entity that owns computing service 802) and immutable record storage 110. In FIG. 8, it is assumed that user device 106 has been previously registered by system 100. Although FIG. 8 illustrates computing service 802, in some examples, a similar process 800 may be performed when user device 106 requests registration for a computing device (rather than computing service 802).

At step 806, user 108, via user device 106 and/or directly on computing service 802, may send a request to sign up for computing service 802. Computing service 802 may be, for example, a web service, a mobile application, identity proofing at a physical location, etc.

At step 808, computing service 802 (e.g. a web application, a mobile application, a physical device, etc.) may prompt user 108 (e.g., via user device 106) to provide identity information (e.g., one or more identity attributes). The identity information may include, without being limited to, an email address, a phone number, residential address, date of birth, identity card, an electronic identity (e.g., a digital driver's license, a digital passport and the like), etc. In some examples, service provider 804 (rather than computing service 802) may send the identity proofing request to user 108 and/or user device 106. In some examples, where service provider 804 delegates IAM operation to identity provider 102 (or a third party), identity provider 102 may send the identity proofing request to user 108 and/or user device 106.

At step 810, user 108 may authorize the identity proofing request (prompt), on user device 106 and/or directly on computing service 802, by deriving an authorization response, for example, using user access credentials (e.g., access credential(s) 140 on user device 106) and user identity information (e.g., identity attribute(s) 142 on user device 106). In some examples, depending on pre-defined security condition(s) of service provider 804 and/or on a sensitivity of computing service 802, the authorization may include additional information, such as (without being limited to) a user identity card, passport, payment data, an electronic identity (e.g., a digital driver's license, a digital passport and the like), and/or any other data that may be used to uniquely identify user 108.

At step 812, user device 106 may send the authorized user identity information to service provider 804 (or identity provider 102). In some examples, the identity information may be signed with a digital signature created using the user device access credentials provisioned on user device 106 at registration.

At step 814, service provider 804 (or identity provider 102) may retrieve the user's identity attribute(s) and/or access credential reference from immutable record storage 110. In some examples, service provider 804 (or identity provider 102) may execute the verification directly on an immutable record of immutable record storage 110, by providing the authorization response to a pre-defined function on the immutable record storage 110 to validate. In some examples, service provider 804 (or identity provider 102) may verify the additional user identity information via a third party.

At step 816, service provider 804 (or identity provider 102) may verify and validate the user identity (obtained at step 812) using the retrieved identity attributes (obtained at step 814). At step 818, service provider 803 may automatically register user 108 to the intended computing service 802 when the identity proofing is satisfied (at step 816). When the identity proofing is not satisfied (at step 816), service provider 804 may reject the user's sign up request (step 806) for the intended computing service 802 and/or prompt user 108 via user device 106 for additional identity information.

Referring to FIG. 9, a signal flow diagram of exemplary method 900 of authentication and/or authorization for privileged insider threat prevention system 100 is shown, where user device 902 is the same as a computing device/service on a computing device, such as computing service 126 and/or computing device 128). The example process 900 may be performed between user device 902, user 108, relying party 104 (or identity provider 102) and immutable record storage 110. In FIG. 9, it is assumed that user device 902 has been previously registered by system 100. FIG. 9 illustrates a user case where the access credential(s) may be stored on the computing device but may be used to access a computing service. In this example, the access credential(s) may not necessarily be used to access the computing device, but rather to access a computing service on the computing device.

At step 904, user 108 may initiate an access request to a computing system and/or a computing service on a computing device, via user device 902. At step 906, the computing system and/or computing service on a computing device (via user device 902) may prompt user 108 to authenticate.

At optional step 908, relying party 104 and/or identity provider 102 (referred to herein as RP 104 and/or IdP 102), rather than the computing system/computing service on the computing device (i.e., in place of step 906), may send an authentication request to user device 904 (which is the same as the computing system/computing device).

At step 910, user 108 may authenticate by deriving an authentication response using the user and/or device's access credentials. In some examples, the user access credentials may include one or more biometric factors (such as facial, fingerprint, iris etc.), knowledge (such as a passcode) and/or one or more cryptographic keys. In some examples, user device 106 may not need to store the access credential(s) for the computing system/computing service. Instead, the access credentials may be derived based on a prior registration (e.g., based on facial recognition). In some examples, depending on the security condition(s) of relying party 104 and/or on the sensitivity of the computing system/ service on the computing device, the authentication may include proving possession of user device 902 and/or of the computing system/service on the computing device.

At step 912, user device 902 may send the derived authentication response to RP 104 and/or IdP 102. In some examples, the derived authentication response may include a digital signature created using the user and/or device access credentials provisioned on user device 902 at registration.

At step 914, RP 104 and/or IdP 102 may retrieve the user and/or device's access credential reference from immutable record storage 110. In some examples, RP 104 and/or IdP 102 may execute the validation directly on an immutable record of immutable record storage 110, by providing the authentication response to a pre-defined function on the immutable record to validate.

At step 916, RP 104 and/or IdP 102 may verify and validate the authentication response (received at step 912) using the retrieved user and/or device access credential reference (obtained at step 914). At step 918, RP 104 and/or IdP 102 may grant user 108 access to the intended resources (e.g., computing service(s), location(s)) and/or to authorize a transaction, when pre-defined authentication and/or transaction authorization condition(s) is satisfied (at step 916). When the pre-defined authentication and/or authorization condition(s) are not satisfied (at step 916), the access request may be rejected, and access by user 108 may be denied.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through a network or wireless links. Computers may also comprise of software which may direct the operations of the aforementioned components. Computers may be referred to as servers, personal computers (PCs), mobile devices, and other terms for computing/communication devices (including, in some examples, one or more computing devices implemented in a cloud computing environment). For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via a wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with a threat prevention system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, an on-site computing device specially configured for a particular entity, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the privilege insider threat prevention systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 10:
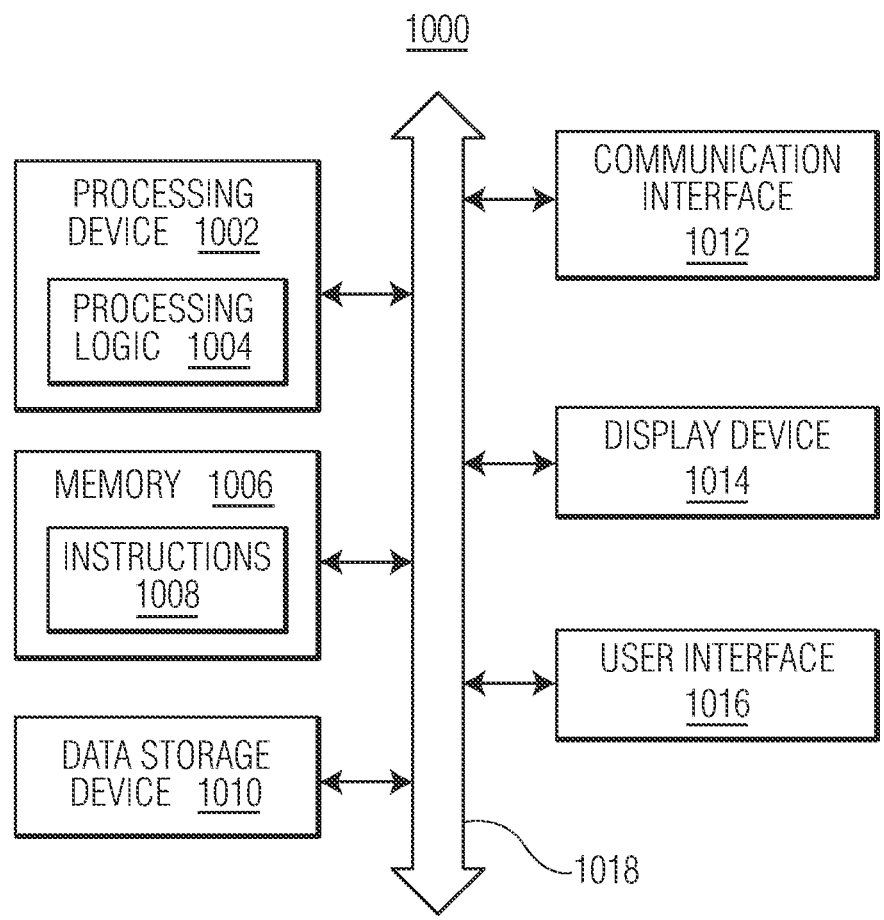
FIG. 10 is a functional block diagram of an example computer system according to an aspect of the present disclosure.

FIG. 10 illustrates a functional block diagram of a machine in the example form of computer system 1000 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more components of identity provider 102 (registration service 112, optional user database 114, optional identity broker 116, optional AAS 118), relying party 104 (server 120, database 122, resource(s) 124), user device 106 and/or immutable record storage 110 may be implemented by a specialized machine, particularly programmed to perform certain functions, such as the example machine shown in FIG. 10 (or a combination of two or more of such machines).

Example computer system 1000 may include processing device 1002, memory 1006, data storage device 1010 and communication interface 1012, which may communicate with each other via data and control bus 1018. In some examples, computer system 1000 may also include display device 1014 and/or user interface 1016.

Processing device 1002 may include, without being limited to, a microprocessor, a central processing unit, an application-specific integrated circuit (ASIC), a field programmable gate array (FPGA), a digital signal processor (DSP) and/or a network processor. Processing device 1002 may be configured to execute processing logic 1004 for performing the operations described herein. Processing device 1002 may include a special-purpose processing device specially programmed with processing logic 1004 to perform the operations described herein.

Memory 1006 may include, for example, without being limited to, at least one of a read-only memory (ROM), a random access memory (RAM), a flash memory, a dynamic RAM (DRAM) and a static RAM (SRAM), storing computer-readable instructions 1008 executable by processing device 1002. Memory 1006 may include a non-transitory computer readable storage medium storing computer-readable instructions 1008 executable by processing device 1002 for performing the operations described herein. For example, computer-readable instructions 1008 may include operations performed by one or more components of identity provider 102, relying party 104, user device 106 and immutable record storage 110, including operations shown in FIGS. 2-9. Although one memory device 1006 is illustrated in FIG. 10, in some examples, computer system 1000 may include two or more memory devices (e.g., dynamic memory and static memory).

Computer system 1000 may include communication interface device 1012, for direct communication with other computers (including wired and/or wireless communication) and/or for communication with a network. In some examples, computer system 1000 may include display device 1014 (e.g., a liquid crystal display (LCD), a touch sensitive display, etc.). In some examples, computer system 1000 may include user interface 1016 (e.g., an alphanumeric input device, a cursor control device, etc.).

In some examples, computer system 1000 may include data storage device 1010 storing instructions (e.g., software) for performing any one or more of the functions described herein. Data storage device 1010 may include a non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

What is claimed:

1. A threat prevention system comprising:
   a server coupled with memory;
   an identity provider system comprising at least one computing device configured to at least one of identify and authenticate one or more users;
   a relying party system including the server configured to provide access to at least one electronic resource; and
   a storage system configured to store one or more immutable records, the storage system being in communication with the identity provider system and the relying party system via at least one network, the one or more immutable records configured to store user credential reference information associated with the one or more users, the user credential reference information including verifiable assurance of user identity mutually written by the identity provider system and the relying party system,
   wherein:
   the threat prevention system is configured to receive, via the at least one electronic resource, a user request from at least one user device associated with at least one user among the one or more users, and
   the identity provider system and the relying party system are configured to independently at least one of verify and validate the user request associated with the at least one user based on the user credential reference information stored in the one or more immutable records, wherein the threat prevention system is further configured to:

generate and transmit, via the at least one user device, an authentication response to an entity among the at least one electronic resource, the relying party system and the identity provider system, based on at least one user credential reference stored on the at least one user device, verify, by a verification entity comprising at least one of the relying party system and the identity provider system, the authentication response by comparing the stored at least one user credential reference to a registered at least one user credential reference associated with the at least one user among the stored user credential information in the storage system, and grant, by at least one of the relying party system and the identity provider system, the user request when the authentication response is verified.

2. The threat prevention system of claim 1, wherein each of the identity provider system and the relying party system are prevented from at least one of altering and destroying the user credential reference information stored on the one or more immutable records.

3. The threat prevention system of claim 1, wherein the user request includes at least one of a transaction request and an access request to the at least one electronic resource.

4. The threat prevention system of claim 1, wherein the at least one electronic resource comprises at least one of one or more computing services and one or more computing devices.

5. The threat prevention system of claim 1, wherein the storage system comprises at least one of a blockchain network, at least one distributed ledger and write once read many (WORM) storage.

6. The threat prevention system of claim 1, wherein the threat prevention system is configured to perform a multi-party authorization for granting the user request.

7. The threat prevention system of claim 1, wherein the relying party system includes at least one service provider.

8. The threat prevention system of claim 1, wherein the threat prevention system is configured to:

receive, via the relying party system, an access request, the access request received from a privilege insider pretending to be associated with a registered user device;

transmit, by the relying party system, an authentication request to the registered user device requesting proof of user identity, the authentication request being intercepted by the privilege insider;

receive, by the relying party system, a forged authentication response from the privilege insider;

determine, by at least one of the relying party system and the identity provider system, that the access request does not originate from the registered user device, responsive to the forged authentication response, based on one or more of at least one factor not present in the forged authentication response and that the forged authentication response is not a unique reply, the at least one factor including at least one of device attestation information specific to the registered user device and at least one credential reference among the user credential reference information associated with proofed user identity on the registered user device; and prevent, by at least one of the relying party system and the identity provider system, an access indicated in the access request responsive to said determination.

9. The threat prevention system of claim 8, wherein the at least one factor includes at least one of device attestation information specific to the registered user device and at least one credential reference among the user credential reference information associated with proofed user identity on the registered user device.

10. The threat prevention system of claim 1, wherein the at least one user device is configured to communicate with one or more of the identity provider system, the relying party system and the storage system.

11. The threat prevention system of claim 10, wherein:

the at least one user device is configured to store a) device attestation information specific to the at least one user device and b) the at least one user credential reference among the user credential reference information that is associated with the at least one user, the storage system being configured to register the device attestation information and the at least one user credential reference among the one or more immutable records, and the stored device attestation information and user identity information being used to create the at least one user credential reference during a registration procedure.

12. The threat prevention system of claim 11, wherein the threat prevention system is further configured to:

transmit, via the entity, an authentication request to the at least one user device requesting proof of user identity, the authentication response being generated responsive to the authentication request.

13. The threat prevention system of claim 1, wherein the authentication response further includes user identity information and the verify by the verification entity further comprises verifying the user identity information with registered user identity information stored among the one or more immutable records in the storage system.

14. A method for preventing insider threats, the method comprising:

storing, in a storage system, one or more immutable records, the storage system in communication with an identity provider system and a relying party system via at least one network, the one or more immutable records configured to store user credential reference information associated with one or more users, the user credential reference information including verifiable assurance of user identity mutually written by the identity provider system and the relying party system, the identity provider system configured to at least one of identify and authenticate the one or more users, the relying party system configured to provide access to at least one electronic resource;

receiving, via the at least one electronic resource, a user request from at least one user device associated with at least one user among the one or more users; and independently, by one or more or the identity provider system and the relying party system, verify and validate the user request associated with the at the least one user based on the user credential reference information stored in the one or more immutable records, wherein the method further comprises:

generating and transmitting, via the at least one user device, an authentication response to an entity among the at least one electronic resource, the relying party system and the identity provider system, based on at least one user credential reference stored on the at least one user device;

verifying, by a verification entity comprising at least one of the relying party system and the identity provider system, the authentication response by comparing the stored at least one user credential reference to a registered at least one user credential reference associated with the at least one user among the stored user credential reference information in the one or more immutable records; and granting, by at least one of the relying party system and the identity provider system, the user request when the authentication response is verified.

15. The method of claim 14, the method further comprising:
preventing each of the identity provider system and the relying party system from at least one of altering and destroying the user credential reference information stored on the one or more immutable records.

16. The method of claim 14, the method further comprising:
receiving, via the relying party system, an access request, the access request received from a privilege insider pretending to be associated with a registered user device;
transmitting, by the relying party system, an authentication request to the registered user device requesting proof of user identity, the authentication request being intercepted by the privilege insider;
receiving, by the relying party system, a forged authentication response from the privilege insider;
determining, by at least one of the relying party system and the identity provider system, that the access request does not originate from the registered user device, responsive to the forged authentication response, based on one or more of at least one factor not present in the forged authentication response and that the forged authentication response is not a unique reply, the at least one factor including at least one of device attestation information specific to the registered user device and at least one credential reference among the user credential reference information associated with proofed user identity on the registered user device; and
preventing, by at least one of the relying party system and the identity provider system, an access indicated in the access request responsive to said determination.

17. The method of claim 14, the method further comprising a registration process, the registration process comprising:
creating, via the at least one user device associated with the at least one user, device attestation information specific to the at least one user device, the device attestation information stored on the at least one user device, the at least one user device configured to communicate with one or more of the identity provider system, the relying party system and the storage system;
verifying, by the verification entity, the device attestation information;
registering, via the storage system, the device attestation information in at least one record among the one or more immutable records, responsive to said verifying;

receiving, via the at least one user device, authorization user input indicative of authorization for registration of the at least one user device;

transmitting, by the at least one user device, an indication of the authorization user input to the storage system; and establishing, via the storage system, the at least one user device as at least one trusted user device having the registered device attestation information, responsive to the indication form the at least one user device.

18. The method of claim 17, the method further comprising:
receiving, via the at least one trusted user device, user identity information associated with the at least one user;
transmitting, via the at least one trusted user device, to at least one identification entity, the user identity information attested with the stored device attestation information, the at least one identification entity comprising one or more of the relying party system, the identity provider system and a remote identification entity;
verifying, by the at least one identification entity, a) the user identity information and b) at least one of an integrity and an origin of the user identity information by comparing the stored device attestation information to the registered device attestation information, to form verified user identity information;
cryptographically binding, via the relying party system and the at least one trusted user device, the verified user identity information to the at least one trusted user device; and
creating, by the at least one trusted user device, the user credential reference information responsive to said binding, the user credential reference information stored on the at least one trusted user device.

19. The method of claim 18, the method further comprising:
transmitting, by the at least one trusted user device, to the verification entity, user information attested with the stored device attestation information, the user information comprising the verified user identity information and the user credential reference information;
verifying, by the verification entity, the user information by comparing the stored device attestation information to the registered device attestation information, to form proofed user identity information;
registering, by the storage system, the proofed user identity information in said at least one record among the one or more immutable records; and
creating, via the storage system, at least one user account associated with the at least one user responsive to the proofed user identity information.

20. The method of claim 14, the method further comprising:
transmitting, via the entity, an authentication request to the at least one user device requesting proof of user identity,
the authentication response being generated responsive to the authentication request.

* * * * *